(12) United States Patent
Kaneoya et al.

(10) Patent No.: US 9,487,700 B2
(45) Date of Patent: Nov. 8, 2016

(54) LIQUID CRYSTAL DISPLAY DEVICE

(71) Applicant: DIC CORPORATION, Tokyo (JP)

(72) Inventors: Masakazu Kaneoya, Kita-adachi-gun (JP); Kiyofumi Takeuchi, Kita-adachi-gun (JP); Seiji Funakura, Kamisu (JP); Isao Oshiumi, Tokyo (JP); Katsunori Shimada, Sakura (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/426,494

(22) PCT Filed: Aug. 22, 2013

(86) PCT No.: PCT/JP2013/072425
§ 371 (c)(1),
(2) Date: May 4, 2015

(87) PCT Pub. No.: WO2014/041985
PCT Pub. Date: Mar. 20, 2014

(65) Prior Publication Data
US 2015/0232757 A1    Aug. 20, 2015

(30) Foreign Application Priority Data
Sep. 11, 2012  (JP) .................................. 2012-199423

(51) Int. Cl.
*C09K 19/30* (2006.01)
*C09K 19/20* (2006.01)
(Continued)

(52) U.S. Cl.
CPC ....... *C09K 19/3001* (2013.01); *C09K 19/3003* (2013.01); *C09K 19/322* (2013.01);
(Continued)

(58) Field of Classification Search
CPC .............. C09K 19/20; C09K 19/3001; C09K 19/3003; C09K 2019/0446; C09K 2019/122; C09K 2019/123; C09K 2019/301; C09K 2019/3004; C09K 2019/3009; C09K 2019/3016; C09K 2019/3037; C09K 2019/60; C09K 2019/0448; C09K 2019/0466; G02F 1/133512; G02F 1/133514
See application file for complete search history.

(56) References Cited

U.S. PATENT DOCUMENTS 9,193,906 B2 * 11/2015 Ogawa ............... C09K 19/3003
9,298,033 B2 * 3/2016 Ogawa .............. G02F 1/133514
(Continued)

FOREIGN PATENT DOCUMENTS

JP    2000-192040 A    7/2000
JP    2005-281559 A    10/2005
(Continued)

OTHER PUBLICATIONS

International Search Report dated Nov. 26, 2013 issued in corresponding appkication No. PCT/JP2013/072425.

*Primary Examiner* — Shean C Wu
(74) *Attorney, Agent, or Firm* — Westerman, Hattori, Daniels & Adrian, LLP

(57) ABSTRACT

The present invention relates to a liquid crystal display device that uses a particular liquid crystal composition and a color filter that uses a particular pigment.
The present invention provides a liquid crystal display device that prevents a decrease in voltage holding ratio (VHR) and an increase in ion density (ID) of a liquid crystal layer and resolves the problems of display defects, such as missing dots, alignment variation, and ghosting.
Since the liquid crystal display device of the present invention prevents a decrease in voltage holding ratio (VHR) and an increase in ion density (ID) of a liquid crystal layer and resolves the problems of display defects, such as ghosting, it is particularly useful for active matrix drive VA-mode and PSVA-mode liquid crystal display devices and can be applied to liquid crystal display devices such as liquid crystal televisions, monitors, cellular phones, and smart phones.

14 Claims, 1 Drawing Sheet

(51) Int. Cl.
*C09K 19/60* (2006.01)
*G02F 1/1335* (2006.01)
*C09K 19/34* (2006.01)
*C09K 19/32* (2006.01)
*C09K 19/56* (2006.01)
*G02F 1/1334* (2006.01)
*C09K 19/04* (2006.01)

(52) U.S. Cl.
CPC ........... *C09K19/3402* (2013.01); *C09K 19/56* (2013.01); *G02F 1/1334* (2013.01); *G02F 1/133512* (2013.01); *G02F 1/133514* (2013.01); *C09K 19/20* (2013.01); *C09K 2019/0448* (2013.01); *C09K 2019/0466* (2013.01); *C09K 2019/301* (2013.01); *C09K 2019/3004* (2013.01); *C09K 2019/3009* (2013.01); *C09K 2019/3016* (2013.01); *C09K 2019/3078* (2013.01); *C09K 2019/3425* (2013.01)

(56) References Cited

U.S. PATENT DOCUMENTS

| | | |
|---|---|---|
| 2006/0257763 A1 | 11/2006 | Araki |
| 2012/0236246 A1 | 9/2012 | Furusato et al. |
| 2014/0211137 A1 | 7/2014 | Kaneoya et al. |
| 2014/0211138 A1 | 7/2014 | Kaneoya et al. |

FOREIGN PATENT DOCUMENTS

| | | |
|---|---|---|
| JP | 2006-317602 A | 11/2006 |
| JP | 2010-189560 A | 9/2010 |
| JP | 2011-141356 A | 7/2011 |
| WO | 2011/092973 A1 | 8/2011 |
| WO | 2013/094537 A1 | 6/2013 |
| WO | 2013/115164 A1 | 8/2013 |
| WO | 2013/133383 A1 | 9/2013 |

* cited by examiner

LIQUID CRYSTAL DISPLAY DEVICE

TECHNICAL FIELD

The present invention relates to a liquid crystal display device.

BACKGROUND ART

Liquid crystal display devices have come to be used in watches, calculators, various home electric appliances, measurement instruments, automobile panels, word processors, electronic organizers, printers, computers, televisions, and other applications. Representative examples of the liquid crystal display mode include twisted nematic (TN) mode, super twisted nematic (STN) mode, dynamic scattering (DS) mode, guest/host (GH) mode, in-plane-switching (IPS) mode, optically compensated bend (OCB) mode, electrically controlled birefringence (ECB) mode, vertical alignment (VA) mode, color super homeotropic (CSH) mode, and ferroelectric liquid crystals (FLC). As for the driving mode, multiplex driving has become popular replacing the conventional static driving, and the mainstream mode is a simple matrix mode, and recently, an active matrix (AM) mode in which driving is performed by using thin film transistors (TFTs) or thin film diodes (TFDs).

A typical color liquid crystal display device is, as shown in FIG. 1, configured by two substrates (1) each having an alignment film (4), a transparent electrode layer (3a) serving as a common electrode and a color filter layer (2) that are disposed between one of the substrates and the alignment film of this substrate, a pixel electrode layer (3b) disposed between the other substrate and the alignment film of this other substrate, and a liquid crystal layer (5) interposed between the alignment films of the substrates arranged so that the alignment films oppose each other.

The color filter layer is constituted by a color filter that includes a black matrix, a red color layer (R), a green color layer (G), a blue color layer (B), and, if needed, a yellow color layer (Y).

A liquid crystal material constituting a liquid crystal layer has been subject to strict impurity control since impurities remaining in the material will significantly affect electrical properties of display devices. As for the material of an alignment film, the alignment film comes into direct contact with the liquid crystal layer and thus it is known that the impurities remaining in the alignment film will migrate to the liquid crystal layer and affect the electrical properties of the liquid crystal layer. Studies are now being conducted on the properties of liquid crystal display devices affected by impurities in the alignment film materials.

As for materials, such as organic pigments, used in color filter layers, it is possible that the liquid crystal layers would be affected by the impurities contained in the color filters as with the alignment film materials. However, it has been believed that because an alignment film and a transparent electrode are disposed between a color filter layer and a liquid crystal layer, the direct effect on the liquid crystal layer is significantly less than that of the alignment film materials. However, an alignment film usually has a thickness as small as 0.1 μm or less and the thickness of the transparent electrode is usually 0.5 μm or less even for a color-filter-layer-side common electrode that has been made thick to increase the conductivity. Accordingly, it is not proper to assume that a color filter layer and a liquid crystal layer are completely isolated from each other and it is possible that display defects such as missing dots, alignment variation, and ghosting would occur due to a decrease in voltage holding ratio (VHR) and an increase in ion density (ID) of the liquid crystal layer caused by impurities migrating from the color filter layer through the alignment film and the transparent electrode.

Techniques for overcoming display defects caused by impurities in the pigments constituting color filters have been investigated, which include a technique of controlling elution of impurities into liquid crystals by using a pigment that contains a particular fraction or less of an extract from the pigment with ethyl formate (PTL 1) and a technique of controlling elution of impurities into liquid crystals by specifying the pigment used in a blue color layer (PTL 2). However, these techniques are not much different from simply decreasing the amount of impurities contained in the pigment and the improvements brought about thereby are insufficient for resolving display defects under current situations of advancement in pigment purification techniques.

There have also been disclosed a technique that focuses on the relationship between a liquid crystal composition and organic impurities contained in a color filter, in which insolubility of organic impurities in a liquid crystal layer is indicated by a hydrophobicity parameter of liquid crystal molecules contained in the liquid crystal layer and this parameter is controlled to a particular level or higher, and a technique of preparing a liquid crystal composition that contains a particular fraction or more of a liquid crystal compound having an —$OCF_3$ group in a liquid crystal molecule terminus since this hydrophobicity parameter and the —$OCF_3$ group in a liquid crystal molecule terminus are correlated to each other (PTL 3). However, in the disclosure of the cited document, the essence of the invention is to reduce the influence of the impurities in the pigments on the liquid crystal layer; and the direct relationship between the overall structure of the liquid crystal material and the pigments used in the color filter has not been investigated.

It has also been disclosed that the voltage holding ratio (VHR) can be enhanced by using a pigment washed with deionized water until the electrical conductivity of the deionized water filtrate after the washing treatment is 20 μS/cm or less; however, the electrical conductivity of the pigment itself is not mentioned and the voltage holding ratio is only about 95% (PTL 4). This is not sufficient for resolving display defects of recent advanced liquid crystal display elements.

It is known that the water soluble matter in and the electrical conductivity of a pigment affect the antirust effect of antirust paints and discharge properties of inkjet inks (PTL 5 and PTL 6); however, the effect of a combination of the water soluble matter and the electrical conductivity of the pigment and the structure of the liquid crystal material constituting the liquid crystal layer has not been known, and the problem of display defects in advanced liquid crystal display devices has not been resolved.

CITATION LIST

Patent Literature

PTL 1: Japanese Unexamined Patent Application Publication No. 2000-19321

PTL 2: Japanese Unexamined Patent Application Publication No. 2009-109542

PTL 3: Japanese Unexamined Patent Application Publication No. 2000-192040

PTL 4: Japanese Unexamined Patent Application Publication No. 2009-7432

PTL 5: Japanese Unexamined Patent Application Publication No. 2008-144105

PTL 6: Japanese Unexamined Patent Application Publication No. 2010-260997

SUMMARY OF INVENTION

Technical Problem

The present invention provides a liquid crystal display device that uses a particular liquid crystal composition and a color filter containing a pigment having a particular water soluble matter and/or a particular electrical conductivity, with which a decrease in voltage holding ratio (VHR) and an increase in ion density (ID) of a liquid crystal layer are prevented and the problems of display defects such as missing dots, alignment variation, and ghosting are resolved.

Solution to Problem

The inventors of the present application have conducted thorough studies on the combination of the water insoluble matter and/or electrical conductivity of a pigment constituting a color filter and the structure of a liquid crystal material constituting a liquid crystal layer in order to address issues described above. As a result, they have found that a liquid crystal display device that includes a liquid crystal material having a particular structure and a color filter that uses a pigment that has a particular water soluble matter and/or electrical conductivity prevents a decrease in voltage holding ratio (VHR) and an increase in ion density (ID) of a liquid crystal layer and resolves the problems of display defects such as missing dots, alignment variation, and ghosting. Thus, the present invention has been made.

In other words, the present invention provides the following:

A liquid crystal display device comprising a first substrate, a second substrate, a liquid crystal composition layer disposed between the first substrate and the second substrate, a color filter that includes a black matrix and at least RGB three-color pixel portions, a pixel electrode, and a common electrode, wherein the liquid crystal composition layer is composed of a liquid crystal composition that contains one or more compounds selected from the group consisting of compounds represented by general formula (LC1) to general formula (LC4):

[Chem. 1]

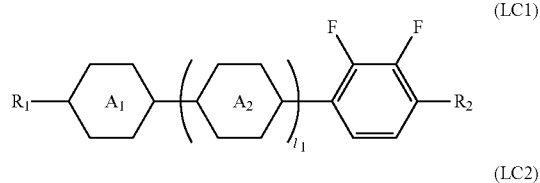
(LC1)

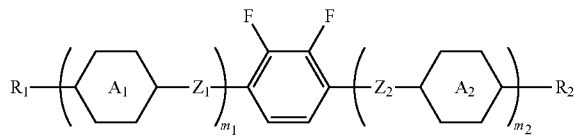
(LC2)

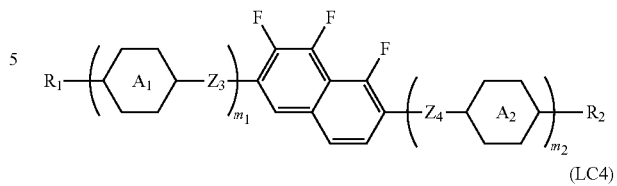
(LC3)

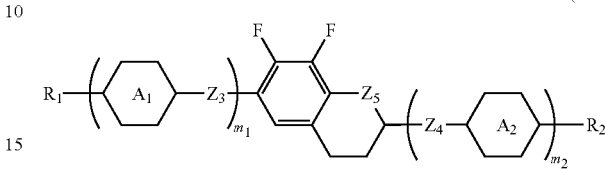
(LC4)

(In the formulae, $R_1$ and $R_2$ each independently represent an alkyl group having 1 to 15 carbon atoms where one or more $CH_2$ groups in the alkyl group may each be substituted with —O—, —CH=CH—, —CO—, —OCO—, —COO—, —C≡C—, —CF$_2$O—, or —OCF$_2$— so long as oxygen atoms are not directly adjacent to each other and one or more hydrogen atoms in the alkyl group may each be substituted with a halogen, $A_1$ and $A_2$ each independently represent one of the following structures:

[Chem. 2]

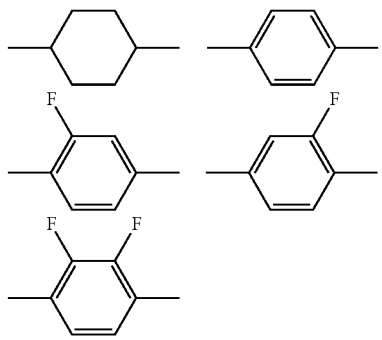

(One or more $CH_2$ groups of a cyclohexane ring in the structure may each be substituted with an oxygen atom, one or more CH groups of a benzene ring in the structure may each be substituted with a nitrogen atom, and one or more hydrogen atoms in the structure may each be substituted with F, Cl, $CF_3$, or $OCF_3$), $Z_1$ to $Z_4$ each independently represent a single bond, —CH=CH—, —C≡C—, —CH$_2$CH$_2$—, —(CH$_2$)$_4$—, —OCO—, —OCH$_2$—, —CH$_2$O—, —OCF$_2$—, or —CF$_2$O—, $Z_5$ represents a $CH_2$ group or an oxygen atom, at least one of $Z_1$ and $Z_2$ that are present represents a group other than a single bond, $l_1$ represents 0 or 1, $m_1$ and $m_2$ each independently represent 0 to 3, and $m_1+m_2$ is 1, 2, or 3.), and the RGB three-color pixel portions contain, as a coloring material, a pigment that has a water soluble matter of 0% by mass or more and 1.5% by mass or less and/or an electrical conductivity of 10 μS/cm or more and 150 μS/cm or less.

Advantageous Effects of Invention

The liquid crystal display device of the present invention can prevent a decrease in voltage holding ratio (VHR) and an increase in ion density (ID) of a liquid crystal layer since a particular liquid crystal composition and a color filter that uses a pigment having a particular water content and/or electrical conductivity are used, and can prevent occurrence of display defects such as missing dots, alignment variation, and ghosting.

Figure 1:
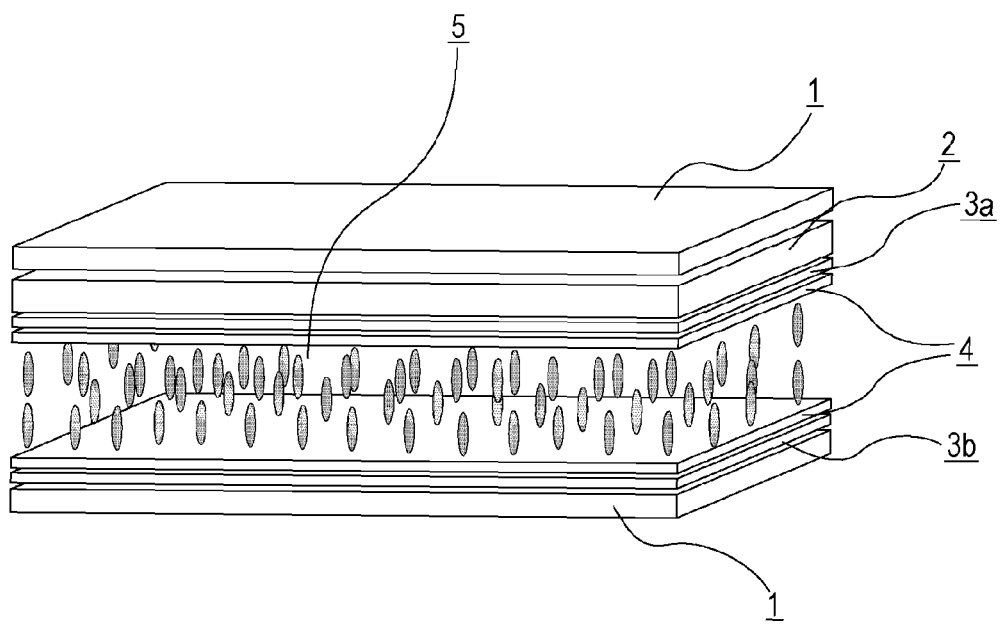
FIG. 1 is a diagram illustrating an example of a conventional typical liquid crystal display device.

REFERENCE SIGNS LIST 1 substrate
2 color filter layer
2a color filter layer containing a particular pigment
3a transparent electrode layer (common electrode)
3b pixel electrode layer
4 alignment film
5 liquid crystal layer
5a liquid crystal layer containing a particular liquid crystal composition

DESCRIPTION OF EMBODIMENTS

Figure 2:
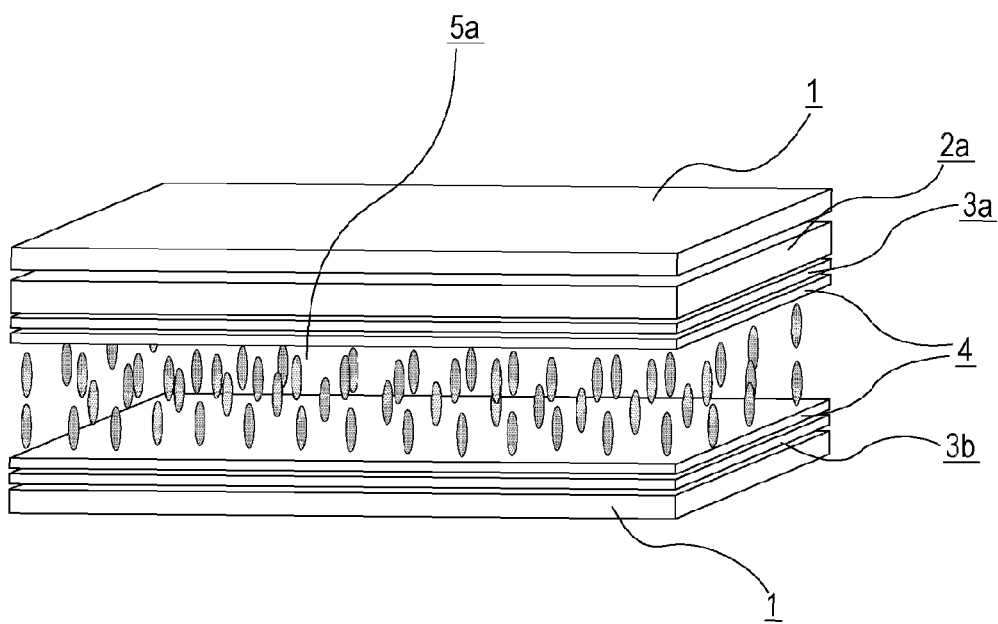
FIG. 2 is a diagram illustrating an example of a liquid crystal display device according to the present invention.

An example of a liquid crystal display device according to the present invention is shown in FIG. 2. Two substrates (1), namely, a first substrate and a second substrate, each having an alignment film (4) are provided. A transparent electrode layer (3a) serving as a common electrode and a color filter layer (2a) containing a particular pigment are interposed between one of the substrates and the alignment film of this substrate, and a pixel electrode layer (3b) is disposed between the other substrate and the alignment film of this substrate. These substrates are arranged so that the alignment films oppose each other and a liquid crystal layer (5a) containing a particular liquid crystal composition is disposed between the substrates.

The two substrates of the display device are bonded to each other with a sealing material and a sealing member arranged in the peripheral region and in most cases particle-shaped spacers or resin spacer columns formed by photolithography are arranged between the substrates to maintain the distance between the substrates.

(Liquid Crystal Layer)

The liquid crystal layer of the liquid crystal display device according to the present invention includes a liquid crystal composition that contains one or more compounds selected from the group of compounds represented by general formula (LC1) to general formula (LC4):

[Chem. 3]

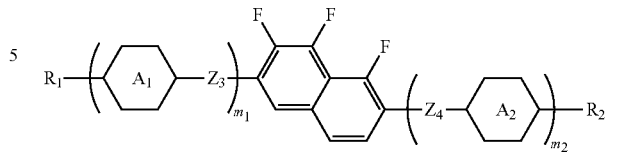
(LC1)

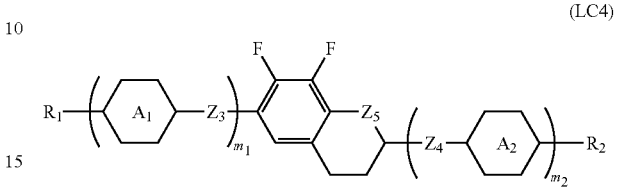
(LC2)

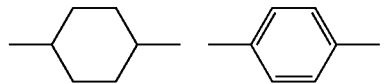
(LC3)

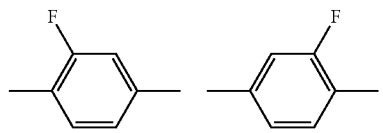
(LC4)

(In the formulae, $R_1$ and $R_2$ each independently represent an alkyl group having 1 to 15 carbon atoms, where one or more $CH_2$ groups in the alkyl group may each be substituted with —O—, —CH=CH—, —CO—, —OCO—, —COO—, —C≡C—, —CF$_2$O—, or —OCF$_2$— so long as oxygen atoms are not directly adjacent to each other and one or more hydrogen atoms in the alkyl group may each be substituted with a halogen, $A_1$ and $A_2$ each independently represent one of the following structures:

[Chem. 4]

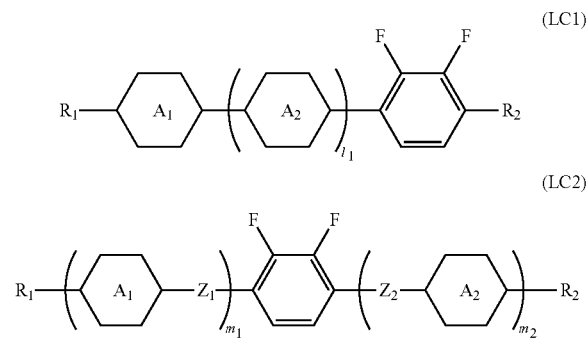

(where one or more $CH_2$ groups of the cyclohexane ring in the structure may each be substituted with an oxygen atom, one or more CH groups in the benzene ring in the structure may each be substituted with a nitrogen atom, and one or more hydrogen atoms in the structure may each be substituted with F, Cl, $CF_3$, or $OCF_3$), $Z_1$ to $Z_4$ each independently represent a single bond, —CH=CH—, —C≡C—, —CH$_2$CH$_2$—, —(CH$_2$)$_4$—, —OCO—, —OCH$_2$—, —CH$_2$O—, —OCF$_2$—, or —CF$_2$O—, $Z_5$ represents a $CH_2$ group or an oxygen atom, at least one of $Z_1$ and $Z_2$ that are present represents a group other than a single bond, $l_1$ represents 0 or 1, $m_1$ and $m_2$ each independently represent 0 to 3, and $m_1+m_2$ is 1, 2, or 3.)

$R_1$ and $R_2$ preferably each independently represent an alkyl group having 1 to 7 carbon atoms, an alkoxy group having 1 to 7 carbon atoms, or an alkenyl group having 2 to 7 carbon atoms.

$A_1$ and $A_2$ preferably each independently represent the following structure:

[Chem. 5]

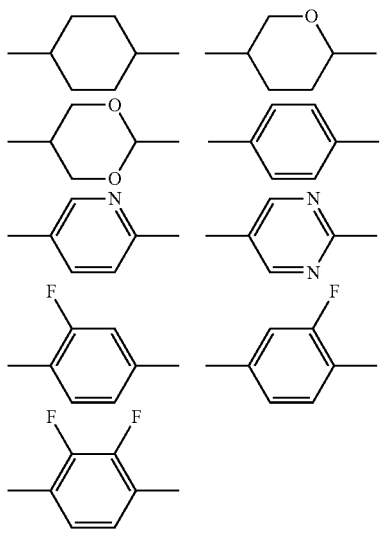

$Z_1$ to $Z_4$ preferably each independently represent a single bond, —CH$_2$CH$_2$—, —COO—, —OCH$_2$—, —CH$_2$O—, —OCF$_2$—, or —CF$_2$O—.

The liquid crystal composition preferably further contains one or more compounds represented by general formula (LC5):

[Chem. 6]

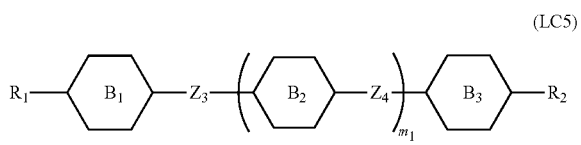

(LC5)

(In the formula, $R_1$ and $R_2$ each independently represent an alkyl group having 1 to 15 carbon atoms where one or more CH$_2$ groups in the alkyl group may each be substituted with —O—, —CH=CH—, —CO—, —OCO—, —COO—, —C≡C—, —CF$_2$O—, or —OCF$_2$— so long as oxygen atoms are not directly adjacent to each other and one or more hydrogen atoms in the alkyl group may each be substituted with a halogen, $B_1$ to $B_3$ each independently represent one of the following:

[Chem. 7]

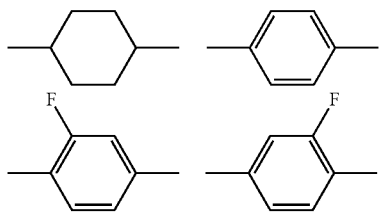

(In the formulae, one or more CH$_2$CH$_2$ groups in the cyclohexane ring may each be substituted with —CH=CH—, —CF$_2$O—, or —OCF$_2$— and one or more CH groups in the benzene ring may each be substituted with a nitrogen atom.), $Z_3$ and $Z_4$ each independently represent a single bond, —CH=CH—, —C≡C—, —CH$_2$CH$_2$—, (CH$_2$)$_4$—, —COO—, —OCH$_2$—, —CH$_2$O—, —OCF$_2$—, or —CF$_2$O—, at least one of $Z_3$ and $Z_4$ represents a group other than a single bond, and $m_1$ represents 0 to 3.)

$R_1$ and $R_2$ preferably each independently represent an alkyl group having 1 to 7 carbon atoms, an alkoxy group having 1 to 7 carbon atoms, or an alkenyl group having 2 to 7 carbon atoms.

$B_1$ to $B_3$ preferably each independently represent one of the following structures:

[Chem. 8]

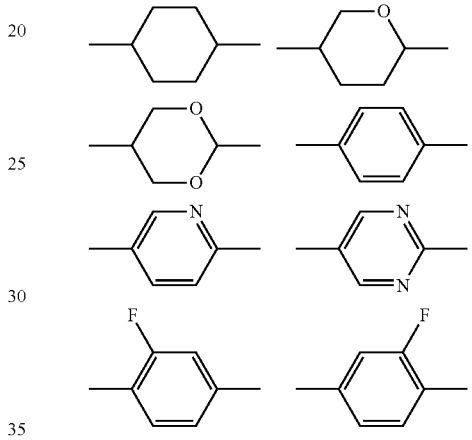

$Z_3$ and $Z_4$ preferably each independently represent a single bond, —CH$_2$CH$_2$—, —COO—, —OCH$_2$—, —CH$_2$O—, —OCF$_2$—, or —CF$_2$O—.

General formula (LC1) is preferably one or more compounds selected from the group consisting of compounds represented by general formula (LC1)-1 to general formula (LC1)-7 below:

[Chem. 9]

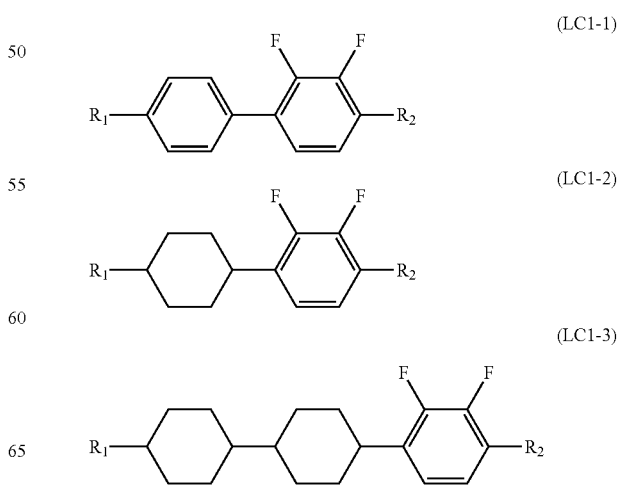

(LC1-4)
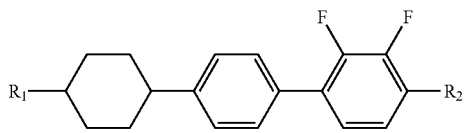

(LC1-5)
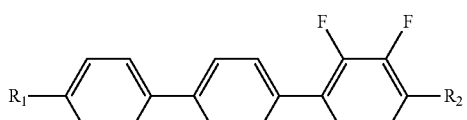

(LC1-6)
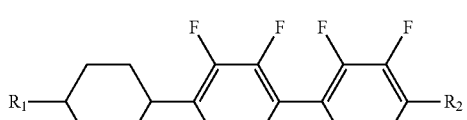

(LC1-7)
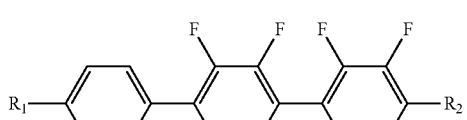

(In the formulae, $R_1$ and $R_2$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms.)

General formula (LC2) is preferably one or more compounds selected from the group consisting of compounds represented by general formula (LC2)-1 to general formula (LC2)-15 below:

[Chem. 10]

(LC2)-1
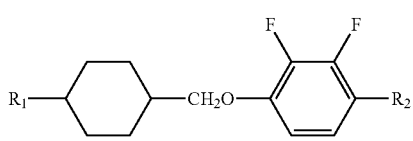

(LC2)-2
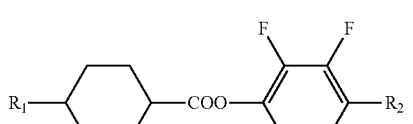

(LC2)-3
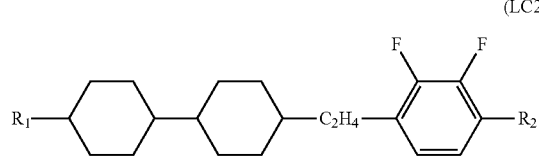

(LC2)-4
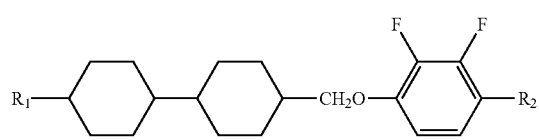

(LC2)-5
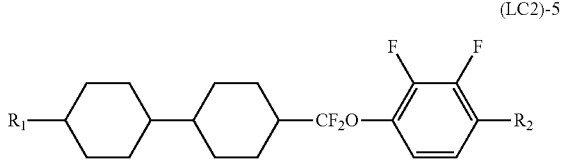

(LC2)-6
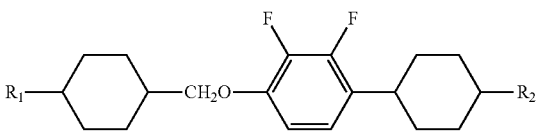

(LC2)-7
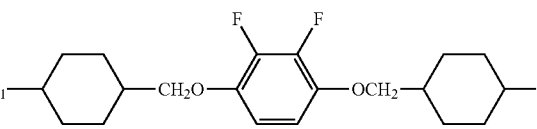

(LC2)-8
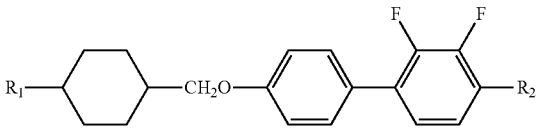

(LC2)-9
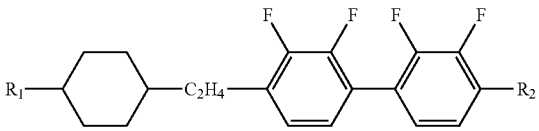

(LC2)-10
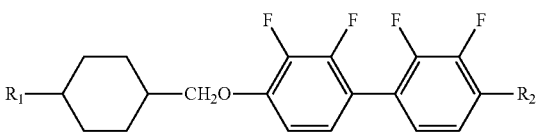

(LC2)-11
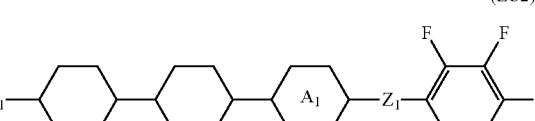

(LC2)-12

(LC2)-13
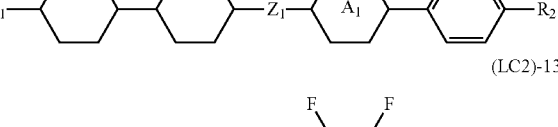

[Chem. 11]

(LC2)-14
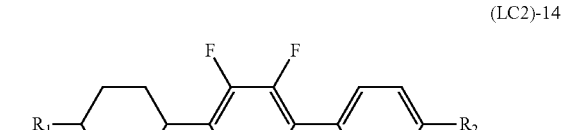

(LC2)-15

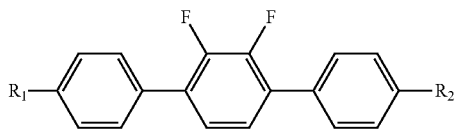

(In the formulae, R₁ and R₂ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms, $Z^1$ represents —CH₂CH₂—, —OCH₂—, —CH₂O—, —OCF₂—, or —CF₂O—, and $A^1$ represents one of the following structures:

[Chem. 12]

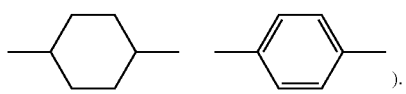

General formula (LC3) is more preferably one or more compounds selected from the group consisting of compounds represented by general formula (LC3)-1 to general formula (LC3)-6 and general formula (LC4) is more preferably one or more compounds selected from the group consisting of compounds represented by general formula (LC4)-1 to general formula (LC4)-4:

[Chem. 13]

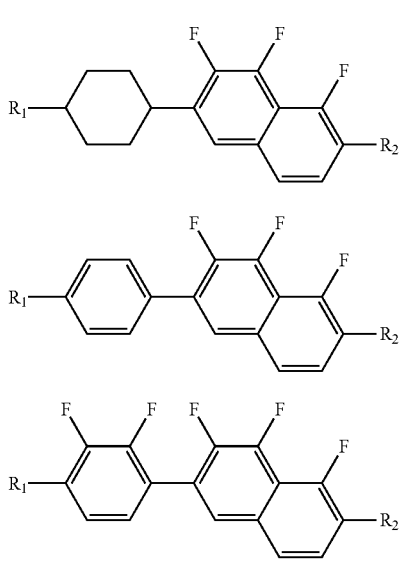

(LC3)-5

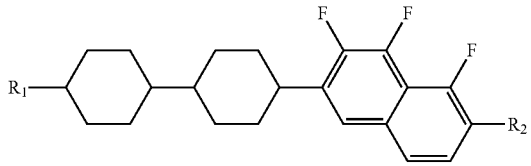

(LC3)-6

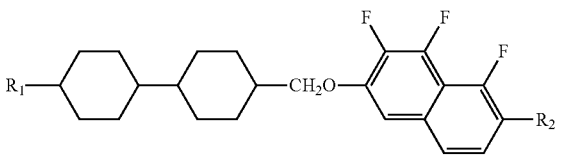

(LC4)-1

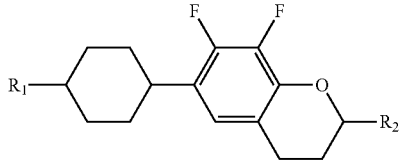

(LC4)-2

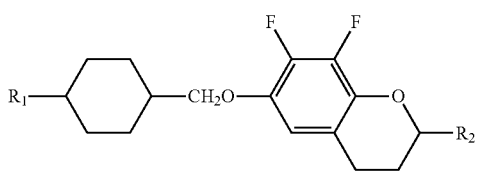

(LC4)-3

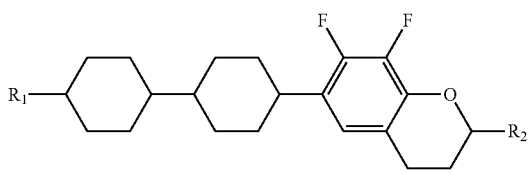

(LC4)-4

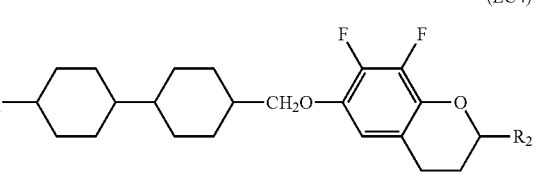

(In the formulae, R₁ and R₂ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms.)

General formula (LC5) is more preferably one or more compounds selected from the group consisting of compounds represented by general formula (LC5)-1 to general formula (LC5)-13

[Chem. 14]

(LC5)-1

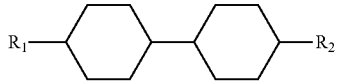

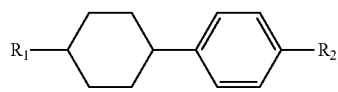 (LC5)-2

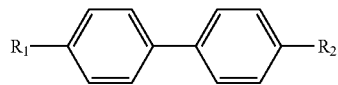 (LC5)-3

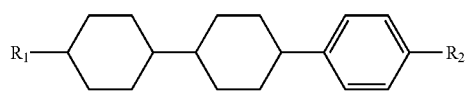 (LC5)-4

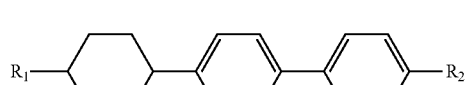 (LC5)-5

 (LC5)-6

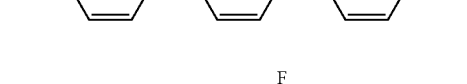 (LC5)-7

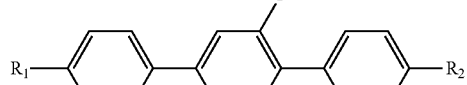 (LC5)-8

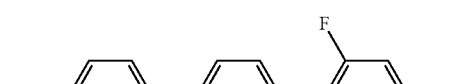 (LC5)-9

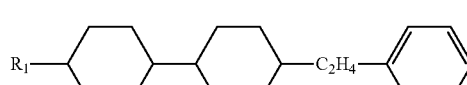 (LC5)-10

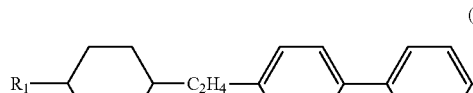 (LC5)-11

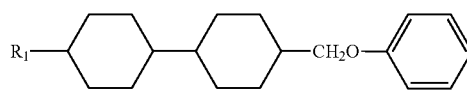 (LC5)-12

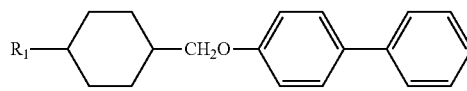 (LC5)-13

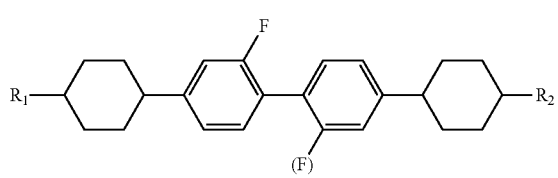

(In the formulae, $R_1$ and $R_2$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms.)

The liquid crystal composition layer may contain one or more polymerizable compounds.

Specifically, the polymerizable compound is preferably a polymerizable compound represented by general formula (PC1):
[Chem. 15]

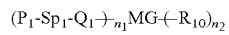 (PC1)

(In the formulae, $P_1$ represents a polymerizable functional group, $Sp_1$ represents a spacer group having 0 to 20 carbon atoms, $Q_1$ represents a single bond, —O—, —NH—, —NHCOO—, —OCONH—, —CH=CH—, —CO—, —COO—, —OCO—, —OCOO—, —OOCO—, —CH=CH—, —CH=CH—OCO—, —OCO—CH=CH—, or —C≡C—, $n_1$ and $n_2$ each represent 1, 2, or 3, MG represents a mesogenic group or a mesogenic supporting group, and $R_{10}$ represents a halogen atom, a cyano group, or an alkyl group having 1 to 25 carbon atoms where one or more $CH_2$ groups in the alkyl group may each be substituted with —O—, —S—, —NH—, —N(CH$_3$)—, —CO—, —COO—, —OCO—, —OCOO—, —SCO—, —COS—, or —C≡C— so long as oxygen atoms are not directly adjacent to each other, or $R_{10}$ represents $P_2$-$Sp_2$-$Q_2$- (In the formula, $P_2$, $Sp_2$, and $Q_2$ are each independently the same as $P_1$, $Sp_1$, and $Q_1$.))

More preferably, MG in general formula (PC1) represents the following structure:

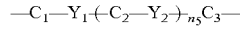 [Chem. 16]

(In the formula, $C_1$ to $C_3$ each independently represent a 1,4-phenylene group, 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene 2,7-diyl group, or a fluorene 2,7-diyl group. The 1,4-phenylene group, the 1,2,3,4-tetrahydronaphthalene-2,6-diyl group, the 2,6-naphthylene group, the phenanthrene-2,7-diyl group, the 9,10-dihydrophenanthrene-2,7-diyl group, the 1,2,3,4,4a, 9,10a-octahydrophenanthrene 2,7-diyl group, and the fluorene 2,7-diyl group may each have, as a substituent, one or more F, Cl, $CF_3$, $OCF_3$, cyano groups, alkyl, alkoxy, alkanoyl, or alkanoyloxy groups each having 1 to 8 carbon atoms, and alkenyl, alkenyloxy, alkenoyl, or alkenoyloxy groups each having 2 to 8 carbon atoms. $Y_1$ and $Y_2$ each independently represent —COO—, —OCO—, —CH$_2$CH$_2$—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, or a single bond, and $n_5$ represents 0, 1, or 2.)

$Sp_1$ and $Sp_2$ each independently represent an alkylene group which may be substituted with at least one halogen atom or cyano group where one or more $CH_2$ groups present in this group may each be substituted with —O—, —S—, —NH—, —N(CH$_3$)—, —CO—, —COO—, —OCO—, —OCOO—, —SCO—, —COS—, or —C≡C— so long as oxygen atoms are not directly adjacent to each other, and $P_1$ and $P_2$ preferably each independently represent a structure represented by any of formula (R-1) to formula (R-15) below:

[Chem. 17]

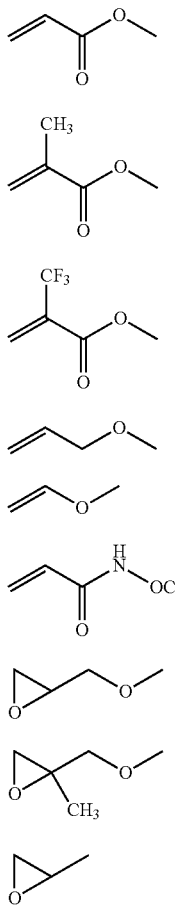

(R-1)
(R-2)
(R-3)
(R-4)
(R-5)
(R-1)
(R-7)
(R-8)
(R-9)

-continued

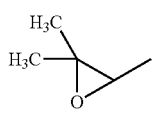
(R-10)

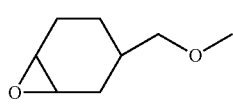
(R-11)

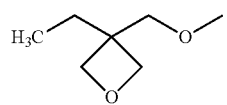
(R-12)

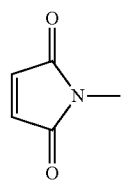
(R-13)

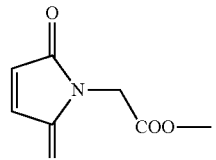
(R-14)

—SH  (R-15)

The polymerizable groups are cured as a result of radical polymerization, radical addition polymerization, cationic polymerization, and anionic polymerization. In particular, when UV polymerization is employed as a polymerization method, formula (R-1), formula (R-2), formula (R-4), formula (R-5), formula (R-7), formula (R-11), formula (R-13), or formula (R-15) is preferable; formula (R-1), formula (R-2), formula (R-7), formula (R-11), or formula (R-13) is more preferable; and formula (R-1) or formula (R-2) is more preferable.

Examples of the polymerizable compound having one polymerizable functional group in a molecule are those represented by general formula (PC1)-0.

[Chem. 18]

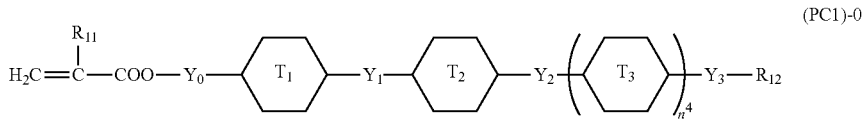
(PC1)-0

(In formula (PC1)-0, $R_{11}$ represents a hydrogen atom or a methyl group and six-membered rings $T_1$, $T_2$, and $T_3$ each independently represent one of the following:

[Chem. 19]

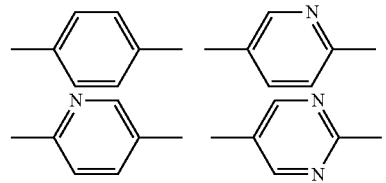

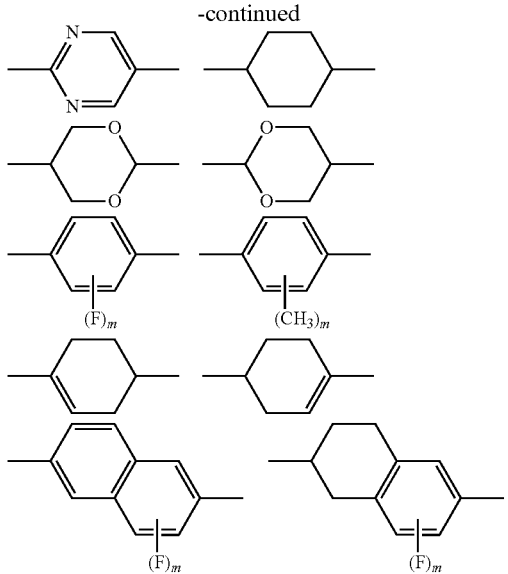

(where m represents an integer of 1 to 4.)
n⁴ represents an integer of 0 or 1,
$Y_0$, $Y_1$, and $Y_2$ each independently represent a single bond, —O—, —OCH$_2$—, —OCH$_2$—, —C$_2$H$_4$—, —OCO—, —OCO—, —CH=CH—, —CO—, —OCOO—, —NH—, —NHCOO—, —OCONH—, —OCOCH$_2$—, —CH$_2$OCO—, —COOCH$_2$—, —CH$_2$COO—, —CH=CH—COO—, —OCO—CH=CH—, —CH=CH—OCO—, —COO—CH=CH—, —CH=CCH$_3$—COO—, —COO—CCH$_3$=CH—, —COOC$_2$H$_4$—, —OCOC$_2$H$_4$—, —C$_2$H$_4$OCO—, —C$_2$H$_4$COO—, —C≡C—, —CF$_2$O—, or —OCF$_2$—, $Y_3$ represents a single bond, —O—, —COO—, or —OCO—, $R_{12}$ represents a hydrogen atom, a halogen atom, a cyano group, an alkyl group having 1 to 20 carbon atoms, an alkenyl group having 1 to 20 carbon atoms, an alkoxy group having 1 to 20 carbon atoms, or a hydrocarbon group having 1 go 20 carbon atoms.) One or more selected from the group consisting of these are preferable as the polymerizable compound.

Examples of the polymerizable compound having two or more polymerizable functional groups in a molecule include those represented by general formula (PC1)-1 or general formula (PC1)-2:

[Chem. 20]

$$(P_1\text{-}Sp_1\text{-}Q_1)_{n_3}\text{MG}(\text{-}Q_2\text{-}Sp_2\text{-}P_2)_{n_4} \quad (PC1)\text{-}1$$

$$(P_1\text{-}Q_1)_{n_3}\text{MG}(\text{-}Q_2\text{-}P_2)_{n_4} \quad (PC1)\text{-}2$$

($P_1$, $Sp_1$, $Q_1$, $P_2$, $Sp_2$, $Q_2$, and MG are the same as those in general formula (PC1), and $n_3$ and $n_4$ each independently represent 1, 2, or 3.)

Specifically, general formula (PC1) is preferably one or more polymerizable compounds selected from the group consisting of compounds represented by general formula (PC1)-3 to general formula (PC1)-11:

[Chem. 21]

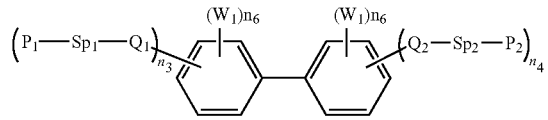

(PC1)-3

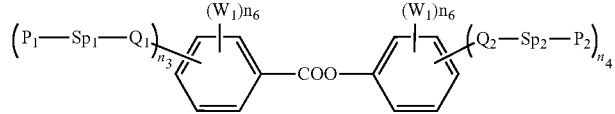

(PC1)-4

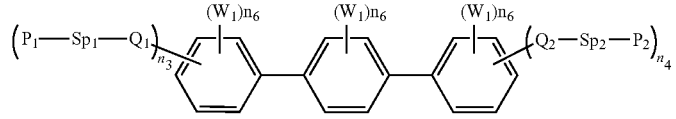

(PC1)-5

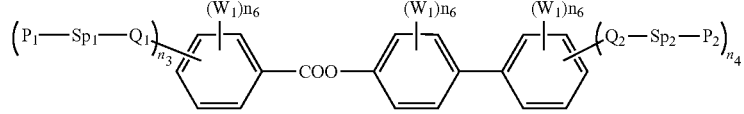

(PC1)-6

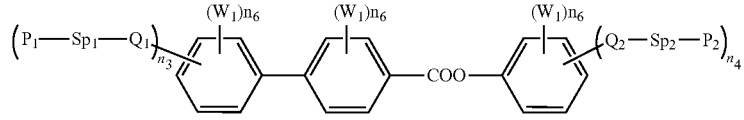

(PC1)-7

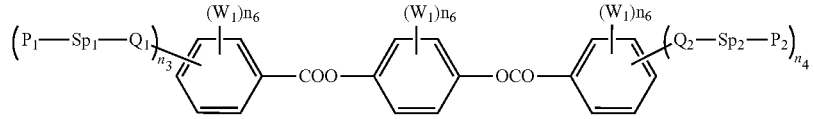

(PC1)-8

[Chem. 22]

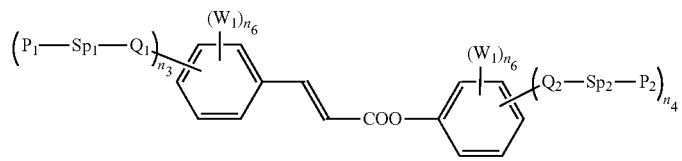
(PC1)-9

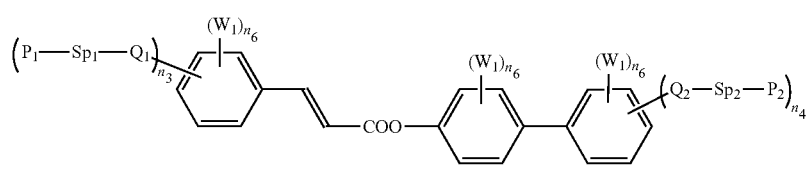
(PC1)-10

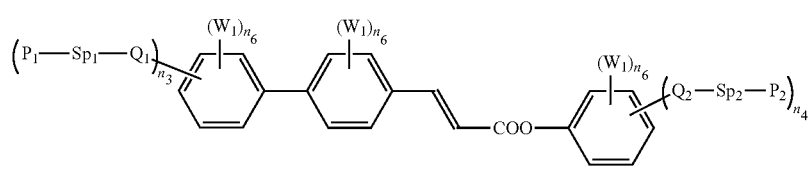
(PC1)-11

(In the formulae, $P_1$, $P_2$, $Sp_1$, $Sp_2$, $Q_1$, and $Q_2$ are the same as those in general formula (PC1), $W_1$ each independently represent F, $CF_3$, $OCF_3$, $CH_3$, $OCH_3$, an alkyl, alkoxy, or alkenyl group having 2 to 5 carbon atoms, $COOW_2$, $OCOW_2$, or $OCOOW_2$ (In the formulae, $W_2$ each independently represent a linear or branched alkyl group having 1 to 10 carbon atoms or an alkenyl group having 2 to 5 carbon atoms), $n_3$ each independently represent 1, 2, or 3, $n_4$ each independently represent 1, 2, or 3, $n_6$ each independently represent 0, 1, 2, 3, or 4, and $n_3+n_6$ and $n_4+n_6$ are each 5 or less in the same ring.)

In general formula (PC1) and general formula (PC1)-1 to general formula (PC1)-11, $Sp_1$, $Sp_2$, $Q_1$, and $Q_2$ preferably each represent a single bond. $n_3+n_4$ is preferably 1 to 3 and preferably 1 or 2. $P_1$ and $P_2$ is preferably formula (R-1) or (R-2). $W_1$ is preferably F, $CF_3$, $OCF_3$, $CH_3$, or $OCH_3$. $n_6$ is preferably 1, 2, 3, or 4.

Specifically, compounds described below are preferable:

[Chem. 23]

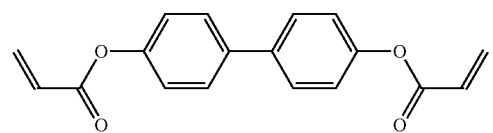
(PC1-3a)

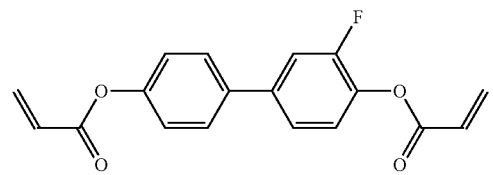
(PC1-3b)

-continued

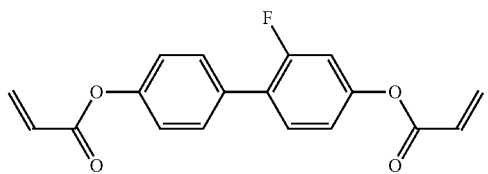
(PC1-3c)

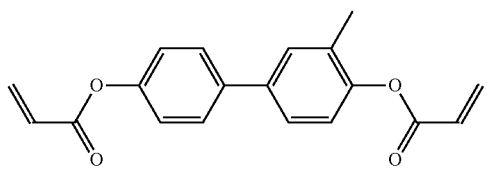
(PC1-3d)

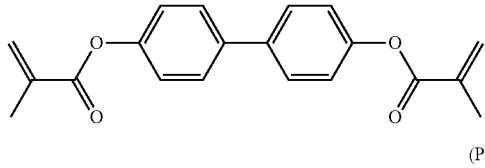
(PC1-3e)

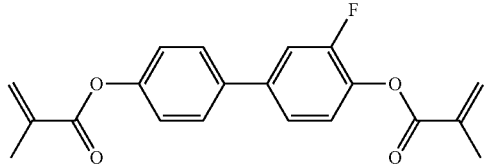
(PC1-3f)

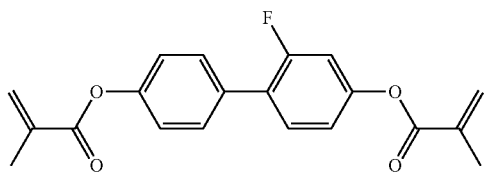
(PC1-3g)

-continued

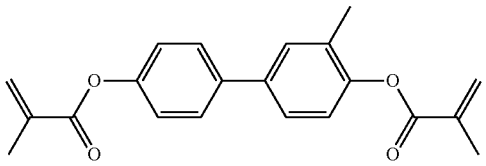
(PC1-3h)

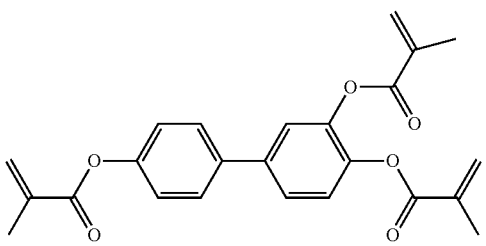
(PC1-3i)

A hydrogen atom of the benzene ring in (PC1-3a) to (PC1-3i) may be substituted with a fluorine atom.

The polymerizable compound is preferably a discotic liquid crystal compound represented by general formula (PC1)-9 below:

[Chem. 24]

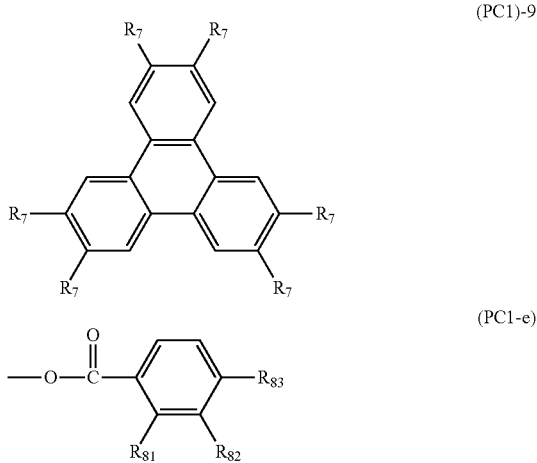
(PC1)-9

(PC1-e)

(In the formulae, $R_7$ each independently represent $P_1$-$Sp_1$-$Q_1$ or a substituent represented by general formula (PC1-e) (in the formula, $P_1$, $Sp_1$, and $Q_1$ are the same as those in general formula (PC1), $R_{81}$ and $R_{82}$ each independently represent a hydrogen atom, a halogen atom, or a methyl group, $R_{83}$ represents an alkoxy group having 1 to 20 carbon atoms, and at least one hydrogen atom in the alkoxy group is substituted with a substituent represented by any of formula (R-1) to (R-15) described above.)

The amount of the polymerizable compound to be used is preferably 0.05 to 2.0% by mass.

The liquid crystal composition can alone be used in the aforementioned applications or may contain one or more antioxidants and/or one or more UV absorbers.

(Color Filter)

The color filter in the present invention is constituted by a black matrix and at least RGB three-color pixel portions; and the RGB three-color pixel portions contain, as a coloring material, a pigment that has a water soluble matter of 0.001% by mass or more and 1.5% by mass or less and/or an electrical conductivity of 10 µS/cm or more and 150 µS/cm or less.

The water soluble matter is preferably 0% by mass or more and 1.2% by mass or less, more preferably 0% by mass or more and 1.0% by mass or less, and most preferably 0% by mass or more and 0.8% by mass or less.

The electrical conductivity is preferably 10 µS/cm or more and 120 µS/cm or less, more preferably 10 µS/cm or more and 100 µS/cm or less, and most preferably 10 or more and 80 µS/cm or less.

More specifically, the water soluble matter is preferably 0% by mass or more and 1.2% by mass or less and the electrical conductivity is preferably 10 µS/cm or more and 120 µS/cm or less.

More preferably, the water soluble matter is 0% by mass or more and 1.0% by mass or less and the electrical conductivity is 10 µS/cm or more and 100 µS/cm or less.

Most preferably, the water soluble matter is 0% by mass or more and 0.8% by mass or less and the electrical conductivity is 10 µS/cm or more and 80 µS/cm or less.

The water soluble matter of the pigment refers to the ratio of components that are contained in the pigment and elute into water relative to the pigment; specifically, the water soluble matter is calculated based on JIS K5101-16-1 (Test methods for pigments—Part 16: Matter soluble in water—Section 1: Hot extraction method).

The method is as follows:

1. Into a 500 mL hard beaker, exactly 5.00 g of a pigment is weighed, 200 mL of ion exchange water (conductivity: 5 µS/cm or less, pH=7.0±1.0) is gradually added at the beginning, and after 5 mL of a reagent 1st grade methanol is added to thoroughly wet the pigment, the rest of the ion exchange water is added, followed by boiling for 5 minutes.

2. The resulting product is cooled to room temperature, placed in a 250 mL measurement cylinder, and combined with the ion exchange water to adjust the amount to 250 mL; and the resulting mixture is thoroughly stirred and filtered with a No. 5C filter produced by Advantec.

3. About 50 mL of the filtrate that first flowed out is discarded, and 100 mL of the filtrate is weighed out from the rest by using a measurement cylinder and placed in an evaporating dish whose mass is known. The filtrate adhering to the measurement cylinder is washed into the evaporating dish with a small amount of ion exchange water.

4. The content of the evaporating dish is evaporated to dryness on a water bath, dried for 2 hours in a dryer maintained at 105° C. to 110° C., and placed in a desiccator. The mass after cooling is measured and the amount of the residue on evaporation is calculated.

5. The water soluble matter is calculated by using the following equation:

Water soluble matter (%) in pigment=amount (g) of residue on evaporation×2.5/mass (g) of pigment×100

The electrical conductivity of the pigment refers to the difference between the electrical conductivity of a filtrate obtained by filtering an aqueous solution prepared by hot extraction of a pigment with ion exchange water and the electrical conductivity of the ion exchange water used. Specifically, it is obtained as the difference between the electrical conductivity of the filtrate obtained by JIS K5101-16-1 (Test methods for pigments—Part 16: Matter soluble in water—Section 1: Hot extraction method) and the electrical conductivity of the ion exchange water used.

Electrical conductivity of pigment=electrical conductivity of filtrate−electrical conductivity of ion exchange water used In the RGB three-color pixel portions, a diketopyrrolopyrrole red pigment is preferably contained as a coloring material in the R pixel unit, a halogenated metal phthalocyanine pigment is preferably contained as a coloring material in the G pixel unit, and an ε-phthalocyanine pigment and/or a triarylmethane pigment is preferably contained as a coloring material in the B pixel unit.

The diketopyrrolopyrrole red pigment contained in the R pixel unit is preferably one or more pigments selected from C.I. Pigments Red 254, 255, 264, and 272, and Orange 71 and 73, more preferably one or more pigments selected from C.I. Pigments Red 254, 255, 264, and 272, and most preferably C.I. Pigment Red 254.

The halogenated metal phthalocyanine pigment contained in the G pixel unit is preferably a halogenated metal phthalocyanine pigment that has, as a center metal, a metal selected from the group consisting of Al, Si, Sc, Ti, V, Mg, Fe, Co, Ni, Zn, Cu, Ga, Ge, Y, Zr, Nb, In, Sn, and Pb. When the center metal is trivalent, one halogen atom, hydroxyl group, or sulfonic acid group is preferably bonded or oxo- or thio-bridged to the center atom. When the center metal is a tetravalent metal, one oxygen atom or two of the same kind or different kinds selected from a halogen atom, a hydroxyl group, and a sulfonic acid group are preferably bonded to the center metal. Examples of the halogenated metal phthalocyanine pigment include the following two groups of halogenated metal phthalocyanine pigments:

(First Group)

Halogenated metal phthalocyanine pigments each having, as a center metal, a metal selected from the group consisting of Al, Si, Sc, Ti, V, Mg, Fe, Co, Ni, Zn, Cu, Ga, Ge, Y, Zr, Nb, In, Sn, and Pb, in which eight to sixteen halogen atoms are bonded to benzene rings of a phthalocyanine molecule per phthalocyanine molecule. When the center metal is trivalent, one halogen atom, hydroxyl group, or sulfonic acid group (—SO$_3$H) bonds to the center atom, and when the center metal is a tetravalent metal, one oxygen atom or two of the same kind or different kinds selected from a halogen atom, a hydroxyl group, and a sulfonic acid group are bonded to the center metal.

(Second Group)

Halogenated metal phthalocyanine dimers each constituted by two molecules as constituent units, in which each molecule has, as a center metal, a trivalent metal selected from the group consisting of Al, Sc, Ga, Y, and In, and contains eight to sixteen halogen atoms bonded to benzene rings of the phthalocyanine molecule per phthalocyanine molecule and in which the center metals of the constituent units are bonded to each other through a divalent atomic group selected from the group consisting of an oxygen atom, a sulfur atom, a sulfinyl (—SO—), and a sulfonyl (—SO$_2$—).

The halogen atoms bonded to the benzene rings in the halogenated metal phthalocyanine pigment may be of the same kind or different kinds. Furthermore, halogen atoms bonded to the same benzene ring may be different from one another.

A halogenated metal phthalocyanine pigment in which nine to fifteen bromine atoms among the eight to sixteen halogen atoms per phthalocyanine molecule are bonded to the benzene rings of the phthalocyanine molecule exhibits a yellowish bright green color and is optimum for use in the green pixel unit of the color filter. The halogenated metal phthalocyanine pigment is insoluble or sparingly soluble in water or organic solvents. The halogenated metal phthalocyanine pigment may be a pigment (also referred to as a crude pigment) that has not been subjected to a finishing treatment described below or a pigment that has been subjected to the finishing treatment.

The halogenated metal phthalocyanine pigments belonging to the first and second groups can be expressed by the following general formula (PIG-1):

[Chem. 25]

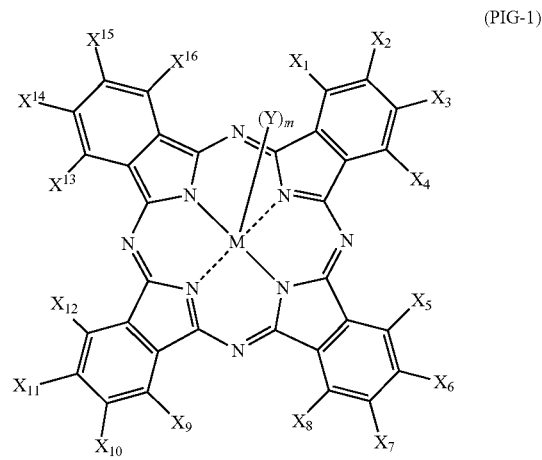

(PIG-1)

The halogenated metal phthalocyanine pigments of the first group expressed by general formula (PIG-1) are as follows:

In general formula (PIG-1), $X_1$ to $X_{16}$ each represent a hydrogen atom, a chlorine atom, a bromine atom, or an iodine atom. Four X atoms bonded to one benzene ring may be the same or different. Among $X_1$ to $X_{16}$ bonded to four benzene rings, eight to sixteen atoms are chlorine, bromine, or iodine atoms. M represents a center metal. For a range of halogenated metal phthalocyanine pigments in which Y and the number m of Y described below are common, pigments in which there are a total of less than eight chlorine, bromine, and iodine atoms out of sixteen $X_1$ to $X_{16}$ are blue in color and pigments in which there are a total of eight or more chlorine, bromine, and iodine atoms out of sixteen $X_1$ to $X_{16}$ exhibit yellow colors that become more intense with the increase in the total number of such atoms. Y bonded to the center metal M is a monovalent atomic group selected from the group consisting of a halogen atom which is fluorine, chlorine, bromine, or iodine, an oxygen atom, a hydroxyl group, and a sulfonic acid group; and m represents the number of Y bonded to the center metal M, and is an integer in the range of 0 to 2.

The valence of the center atom M determines the value m. When the center metal M is trivalent as in the case of Al, Sc, Ga, Y, and In, m=1 and one group selected from the group consisting of fluorine, chlorine, bromine, iodine, a hydroxyl group, and a sulfonic acid group bonds to the center metal. When the center metal M is tetravalent as in the case of Si, Ti, V, Ge, Zr, and Sn, m=2 and either one oxygen bonds to the center atom or two selected from the group consisting of fluorine, chlorine, bromine, iodine, a hydroxyl group, and a sulfonic acid group bond to the center metal. When the center metal M is divalent as in the case or Mg, Fe, Co, Ni, Zn, Cu, Zr, Sn, and Pb, Y does not exist.

The halogenated metal phthalocyanine pigments of the second group expressed by general formula (PIG-1) are as follows.

In general formula (PIG-1), $X_1$ to $X_{16}$ are the same as above. The center metal M is a trivalent metal selected from the group consisting of Al, Sc, Ga, Y, and In, m represents 1, and Y represents the following atomic group:

[Chem. 26]

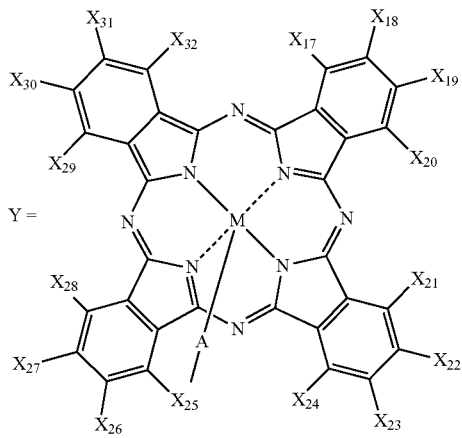

In the chemical structure of the atomic group Y, the center metal M is the same as above, and $X_{17}$ to $X_{32}$ are the same as $X_1$ to $X_{16}$ in general formula (PIG-1). A represents a divalent atomic group selected from the group consisting of an oxygen atom, a sulfur atom, a sulfinyl (—SO—), and a sulfonyl (—SO$_2$—). This means that M in general formula (PIG-1) and M in the atomic group Y are bonded to each other via the divalent atomic group A.

In other words, a halogenated metal phthalocyanine pigment of the second group contains two molecules of halogenated metal phthalocyanine as constitutional units and is a halogenated metal phthalocyanine dimer in which these units are bonded to each other via the divalent atomic group.

Specific examples of the halogenated metal phthalocyanine pigments represented by general formula (PIG-1) include the following (1) to (4).

(1) Halogenated metal phthalocyanine pigments, such as halogenated copper phthalocyanine pigments, halogenated tin phthalocyanine pigments, halogenated nickel phthalocyanine pigments, and halogenated zinc phthalocyanine pigments, in which a divalent metal selected from the group consisting of Mg, Fe, Co, Ni, Zn, Cu, Zr, Sn, and Pb is contained as a center metal and eight to sixteen halogen atoms are bonded to four benzene rings per phthalocyanine molecule. Among these, a chlorinated brominated zinc phthalocyanine pigment is particularly preferably C.I. Pigment Green 58.

(2) Halogenated metal phthalocyanine pigments, such as halogenated chloroaluminum phthalocyanine, in which a trivalent metal selected from the group consisting of Al, Sc, Ga, Y, and In is contained as a center metal, a halogen atom, a hydroxyl group, or a sulfonic acid group is bonded to the center metal, and eight to sixteen halogen atoms are bonded to the four benzene rings per phthalocyanine molecule.

(3) Halogenated metal phthalocyanine pigments, such as halogenated oxytitanium phthalocyanine and halogenated oxyvanadium phthalocyanine, in which a tetravalent metal selected from the group consisting of Si, Ti, V, Ge, Zr, and Sn is contained as a center metal, one oxygen atom or two of the same kind or different kinds selected from a halogen atom, a hydroxyl group, and a sulfonic acid group are bonded to the center metal, and eight to sixteen halogen atoms are bonded to the four benzene rings per phthalocyanine molecule.

(4) Pigments composed of halogenated metal phthalocyanine dimers, such as halogenated μ-oxo-aluminum phthalocyanine dimers and halogenated μ-thio-aluminum phthalocyanine dimers, whose constitutional units are two halogenated metal phthalocyanine molecules each having, as a center metal, a trivalent metal selected from the group consisting of Al, Sc, Ga, Y, and In and eight to sixteen halogen atoms bonded to the four benzene rings per phthalocyanine molecule, and are bonded to each other via a divalent atomic group selected from the group consisting of an oxygen atom, a sulfur atom, a sulfinyl, and a sulfonyl.

As the halogenated metal phthalocyanine pigment in the G pixel unit, specifically, one or more selected from C.I. Pigments Green 7, 36, and 58 are preferable and one or more selected from C.I. Pigments Green 36 and 58 are more preferable.

The ε-phthalocyanine pigment contained in the B pixel unit is preferably C.I. Pigment Blue 15:6. The triarylmethane pigment is preferably C.I. Pigment Blue 1 and/or an triarylmethane pigment represented by general formula (1) below:

[Chem. 27]

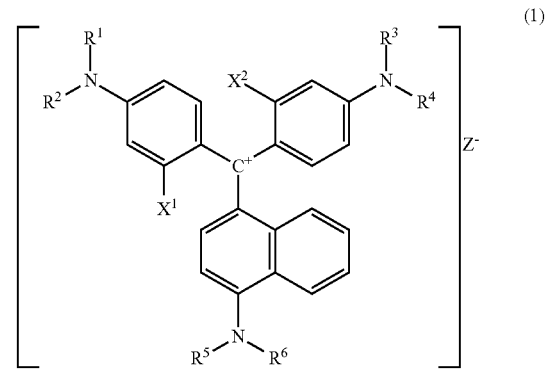

(1)

(In the formula, $R^1$ to $R^6$ each independently represent a hydrogen atom, a substituted or unsubstituted alkyl group having 1 to 8 carbon atom, or a substituted or unsubstituted aryl group. When $R^1$ to $R^6$ represent substituted or unsubstituted alkyl groups, adjacent $R^1$ and $R^2$ may bond to each other to form a ring structure, and so may adjacent $R^3$ and $R^4$ and adjacent $R^5$ and $R^6$. $X^1$ and $X^2$ each independently represent a hydrogen atom, a halogen atom, or a substituted or unsubstituted alkyl group having 1 to 8 carbon atoms. $Z^-$ is at least one anion selected from a heteropolyoxometalate anion represented by $(P_2Mo_yW_{18-y}O_{62})^{6-}/6$ with y being an integer of 0, 1, 2, or 3, a heteropolyoxometalate anion represented by $(SiMoW_{11}O_{40})^{4-}/4$, and a vacant Dawson phosphotungstate heteropolyoxometalate anion. When two or more units represented by formula (1) are contained in one molecule, they may have the same structure or different structures.)

In general formula (1), $R^1$ to $R^6$ may be the same or different. Accordingly, the —NRR (RR represents a combination selected from combinations of $R^1R^2$, $R^3R^4$, and $R^5R^6$) group may be symmetric or asymmetric.

When adjacent R groups (R represents any one of $R^1$ to $R^6$) bond to each other to form a ring, the ring may be bridged by a heteroatom. Specific examples of the ring are described below. These rings may have a substituent.

[Chem. 28]

From the viewpoint of chemical stability, $R^1$ to $R^6$ preferably each independently represent a hydrogen atom, a substituted or unsubstituted alkyl group, or a substituted or unsubstituted aryl group.

In particular, $R^1$ to $R^6$ more preferably each independently represent a hydrogen atom; an alkyl group such as a methyl group, an ethyl group, a propyl group, an isopropyl group, a cyclopropyl group, a butyl group, an isobutyl group, a sec-butyl group, a tert-butyl group, a pentyl group, a cyclopentyl group, a hexyl group, a cyclohexyl group, a heptyl group, an octyl group, or a 2-ethylhexyl group; or an aryl group such as a phenyl group or a naphthyl group.

When $R^1$ to $R^6$ each represent an alkyl group or an aryl group, the alkyl or aryl group may have any substituent. Examples of the substituent of the alkyl group or the aryl group include the following [Substituent Group Y]:
[Substituent Group Y]

Alkyl groups such as a methyl group, an ethyl group, a propyl group, an isopropyl group, a cyclopropyl group, a butyl group, an isobutyl group, a sec-butyl group, a tert-butyl group, a pentyl group, a cyclopentyl group, a hexyl group, a cyclohexyl group, a heptyl group, an octyl group, and a 2-ethyl hexyl group; aryl groups such as a phenyl group and a naphthyl group; halogen atoms such as a fluorine atom and a chlorine atom; a cyano group; a hydroxyl group; alkoxy groups having 1 to 8 carbon atoms, such as a methoxy group, an ethoxy group, a propoxy group, and a butoxy group; substituted or unsubstituted amino groups such as an amino group, a diethylamino group, a dibutylamino group, and an acetylamino group; acyl groups such as an acetyl group and a benzoyl group; and acyloxy groups such as an acetyloxy group and a benzoyloxy group.

$R^1$ to $R^6$ more preferably each represent a substituted or unsubstituted alkyl group having 1 to 8 carbon atoms. Specific examples thereof include unsubstituted alkyl groups such as a methyl group, an ethyl group, a propyl group, an isopropyl group, a butyl group, an isobutyl group, a sec-butyl group, a pentyl group, a hexyl group, or a 2-ethylhexyl group; alkoxyalkyl groups such as a 2-methoxyethyl group and 2-ethoxyethyl group; acyloxy groups such as 2-acetyloxyethyl group; a cyanoalkyl group such as a 2-cyanoethyl group; and fluoroalkyl groups such as a 2,2,2-trifluoroethyl group and a 4,4,4-trifluorobutyl group.

When $X^1$ and $X^2$ each represent the alkyl group described above, any substituent may be contained. Examples of the substituent include halogen atoms such as a fluorine atom, a chlorine atom, a bromine atom, and an iodine atom; and alkoxy groups such as a methoxy group, an ethoxy group, and a propoxy group. Specific examples of $X^1$ and $X^2$ include haloalkyl groups such as a fluoromethyl group, a trifluoromethyl group, a trichloromethyl group, and a 2,2,2-trifluoroethyl group; and alkoxyalkyl groups such as a methoxymethyl group.

$X^1$ and $X^2$ are each preferably a substituent, such as a hydrogen atom, a methyl group, a chlorine atom, or a trifluoromethyl group, that has an appropriate degree of steric hindrance not affecting twisting. $X^1$ and $X^2$ are each most preferably a hydrogen atom, a methyl group, or a chlorine atom from the viewpoints of hue and heat resistance.

$Z^-$ is at least one anion selected from a heteropolyoxometalate anion represented by $(P_2Mo_yW_{18-y}O_{62})^{6-}/6$ with y being an integer of 0, 1, 2, or 3, a heteropolyoxometalate anion represented by $(SiMoW_{11}O_{40})^{4-}/4$, and a vacant Dawson phosphotungstate heteropolyoxometalate anion. The vacant Dawson phosphotungstate is specifically preferably a 1-vacant Dawson phosphotungstate heteropolyoxometalate anion $(P_2W_{17}O_{61})^{10-}/10$ from the viewpoint of durability.

Specific examples of the triarylmethane pigment represented by general formula (1) include compounds described in Tables 1 to 7 below but the present invention is not limited to these as long as the gist of the invention is not exceeded.

TABLE 1

| No | R1 | R2 | R3 | R4 | R5 | R6 | X1 | X2 | Z— |
|----|-----|-----|-----|-----|-----|-----|-----|-----|-----|
| 1 | C2H5— | C2H5— | C2H5— | C2H5— | C2H5— | H | H | H | (P2W18O62)6- |
| 2 | C2H5— | C2H5— | C2H5— | C2H5— | C2H5— | H | H | H | (P2MoW17O62)6- |
| 3 | C2H5— | C2H5— | C2H5— | C2H5— | C2H5— | H | H | H | (P2Mo2W16O62)6- |
| 4 | C2H5— | C2H5— | C2H5— | C2H5— | C2H5— | H | H | H | (P2Mo3W15O62)6- |
| 5 | C2H5— | C2H5— | C2H5— | C2H5— | C2H5— | H | H | H | (SiMoW11O40)4- |
| 6 | C2H5— | C2H5— | C2H5— | C2H5— | C2H5— | H | H | H | (P2W17O61)10- |
| 7 | CH3— | CH3— | CH3— | CH3— | C2H5— | H | H | H | (P2W18O62)6 |
| 8 | CH3— | CH3— | CH3— | CH3— | C2H5— | H | H | H | (P2MoW17O62)6- |
| 9 | CH3— | CH3— | CH3— | CH3— | C2H5— | H | H | H | (P2Mo3W15O62)6- |

TABLE 2

| No | R1 | R2 | R3 | R4 | R5 | R6 | X1 | X2 | Z— |
|----|-----|-----|-----|-----|-----|-----|-----|-----|-----|
| 10 | CH3— | CH3— | CH3— | CH3— | C2H5— | H | H | H | (P2Mo3W15O62)6 |
| 11 | CH3— | CH3— | CH3— | CH3— | C2H5— | H | H | H | (SiMoW11O40)4- |
| 12 | CH3— | CH3— | CH3— | CH3— | C2H5— | H | H | H | (P2W17O61)10- |
| 13 | CH3— | CH3— | CH3— | CH3— | Ph— | H | H | H | (P2W18O62)6- |

TABLE 2-continued

| No | R1 | R2 | R3 | R4 | R5 | R6 | X1 | X2 | Z— |
|----|----|----|----|----|----|----|----|----|----|
| 14 | CH3— | CH3— | CH3— | CH3— | Ph— | H | H | H | (P2MoW17O62)6- |
| 15 | CH3— | CH3— | CH3— | CH3— | Ph— | H | H | H | (P2Mo2W16O62)6- |
| 16 | CH3— | CH3— | CH3— | CH3— | Ph— | H | H | H | (P2Mo3W15O62)6- |
| 17 | CH3— | CH3— | CH3— | CH3— | Ph— | H | H | H | (SiMoW11O40)4- |
| 18 | CH3— | CH3— | CH3— | CH3— | Ph— | H | H | H | (P2W17O61)10- |

TABLE 3

| No | R1 | R2 | R3 | R4 | R5 | R6 | X1 | X2 | Z— |
|----|----|----|----|----|----|----|----|----|----|
| 19 | CH3— | CH3— | CH3— | CH3— | Ph— | Me | H | H | (P2W18O62)6- |
| 20 | CH3— | CH3— | CH3— | CH3— | Ph— | Me | H | H | (P2MoW17O62)6- |
| 21 | CH3— | CH3— | CH3— | CH3— | Ph— | Me | H | H | (P2Mo2W16O62)6- |
| 22 | CH3— | CH3— | CH3— | CH3— | Ph— | Me | H | H | (P2Mo3W15O62)6- |
| 23 | CH3— | CH3— | CH3— | CH3— | Ph— | Me | H | H | (SiMoW11O40)4- |
| 24 | CH3— | CH3— | CH3— | CH3— | Ph— | Me | H | H | (P2W17O61)10- |
| 25 | n-C3H7— | n-C3H7— | n-C3H7— | n-C3H7— | C2H5— | H | H | H | (P2W18O62)6- |
| 26 | n-C3H7— | n-C3H7— | n-C3H7— | n-C3H7— | C2H5— | H | H | H | (P2MoW17O62)6- |
| 27 | n-C3H7— | n-C3H7— | n-C3H7— | n-C3H7— | C2H5— | H | H | H | (P2Mo2W16O62)6- |

TABLE 4

| No | R1 | R2 | R3 | R4 | R5 | R6 | X1 | X2 | Z— |
|----|----|----|----|----|----|----|----|----|----|
| 28 | C2H5— | C2H5— | C2H5— | C2H5— | C2H5— | H | CH3— | H | (P2W18O62)6- |
| 29 | C2H5— | C2H5— | C2H5— | C2H5— | C2H5— | H | CH3— | H | (P2MoW17O62)6- |
| 30 | C2H5— | C2H5— | C2H5— | C2H5— | C2H5— | H | CH3— | H | (P2Mo2W16O62)6- |
| 31 | C2H5— | C2H5— | C2H5— | C2H5— | C2H5— | H | CH3— | H | (P2Mo3W15O62)6- |
| 32 | C2H5— | C2H5— | C2H5— | C2H5— | C2H5— | H | CH3— | H | (SiMoW11O40)4- |
| 33 | C2H5— | C2H5— | C2H5— | C2H5— | C2H5— | H | CH3— | H | (P2W17O61)10- |
| 34 | C2H5— | C2H5— | C2H5— | C2H5— | C2H5— | H | CH3— | CH3— | (P2W18O62)6 |
| 35 | C2H5— | C2H5— | C2H5— | C2H5— | C2H5— | H | CH3— | CH3— | (P2MoW17O62)6- |
| 36 | C2H5— | C2H5— | C2H5— | C2H5— | C2H5— | H | CH3— | CH3— | (P2Mo3W15O62)6- |

TABLE 5

| No | R1 | R2 | R3 | R4 | R5 | R6 | X1 | X2 | Z— |
|----|----|----|----|----|----|----|----|----|----|
| 37 | C2H5— | C2H5— | C2H5— | C2H5— | C2H5— | H | CH3— | CH3— | (P2Mo3W15O62)6- |
| 38 | C2H5— | C2H5— | C2H5— | C2H5— | C2H5— | H | CH3— | CH3— | (SiMoW11O40)4- |
| 39 | C2H5— | C2H5— | C2H5— | C2H5— | C2H5— | H | CH3— | CH3— | (P2W17O61)10- |
| 40 | C2H5— | C2H5— | C2H5— | C2H5— | C2H5— | H | Cl | H | (P2W18O62)6- |
| 41 | C2H5— | C2H5— | C2H5— | C2H5— | C2H5— | H | Cl | H | (P2MoW17O62)6- |
| 42 | C2H5— | C2H5— | C2H5— | C2H5— | C2H5— | H | Cl | H | (P2Mo2W16O62)6- |
| 43 | C2H5— | C2H5— | C2H5— | C2H5— | C2H5— | H | Cl | H | (P2Mo3W15O62)6- |
| 44 | C2H5— | C2H5— | C2H5— | C2H5— | C2H5— | H | Cl | H | (SiMoW11O40)4- |
| 45 | C2H5— | C2H5— | C2H5— | C2H5— | C2H5— | H | Cl | H | (P2W17O61)10- |

| No | R1 | R2 | R3 | R4 | R5 | R6 | X1 | X2 | Z— |
|----|----|----|----|----|----|----|----|----|----|
| 46 | C2H5— | C2H5— | C2H5— | C2H5— | C2H5— | C2H5— | H | H | (P2W18O62)6- |
| 47 | C2H5— | C2H5— | C2H5— | C2H5— | C2H5— | C2H5— | H | H | (P2MoW17O62)6- |
| 48 | C2H5— | C2H5— | C2H5— | C2H5— | C2H5— | C2H5— | H | H | (P2Mo2W16O62)6- |
| 49 | C2H5— | C2H5— | C2H5— | C2H5— | C2H5— | C2H5— | H | H | (P2Mo3W15O62)6- |
| 50 | C2H5— | C2H5— | C2H5— | C2H5— | C2H5— | C2H5— | H | H | (SiMoW11O40)4- |
| 51 | C2H5— | C2H5— | C2H5— | C2H5— | C2H5— | C2H5— | H | H | (P2W17O61)10- |
| 52 |  | |  | | C2H5— | H | H | H | (P2W18O62)6- |

-continued

| No | R1 | R2 | R3 | R4 | R5 | R6 | X1 | X2 | Z— |
|----|----|----|----|----|----|----|----|----|----|
| 53 |  |  | | | C2H5— | H | H | H | (P2MoW17O62)6- |
| 54 |  |  | | | C2H5— | H | H | H | (P2Mo2W16O62)6- |

| No | R1 | R2 | R3 | R4 | R5 | R6 | X1 | X2 | Z— |
|----|----|----|----|----|----|----|----|----|----|
| 55 |  | |  | | C2H5— | H | H | H | (P2Mo3W15O62)6- |
| 56 |  | |  | | C2H5— | H | H | H | (SiMoW11O40)4- |
| 57 |  | |  | | C2H5— | H | H | H | (P2W17O61)10- |
| 58 | 4,4,4-trifluorobutyl | 4,4,4-trifluorobutyl | C2H5— | C2H5— | C2H5— | H | H | H | (P2W18O62)6- |
| 59 | 4,4,4-trifluorobutyl | 4,4,4-trifluorobutyl | C2H5— | C2H5— | C2H5— | H | H | H | (P2MoW17O62)6- |
| 60 | 4,4,4-trifluorobutyl | 4,4,4-trifluorobutyl | C2H5— | C2H5— | C2H5— | H | H | H | (SiMoW11O40)4- |
| 61 | 4,4,4-trifluorobutyl | 4,4,4-trifluorobutyl | C2H5— | C2H5— | C2H5— | H | CH3— | H | (P2W18O62)6- |
| 62 | 4,4,4-trifluorobutyl | 4,4,4-trifluorobutyl | C2H5— | C2H5— | C2H5— | H | CH3 | H | (P2MoW17O62)6- |
| 63 | 4,4,4-trifluorobutyl | 4,4,4-trifluorobutyl | C2H5— | C2H5— | C2H5— | H | CH3 | H | ((SiMoW11O40)4- |

In the RGB three-color pixel portions, the R pixel unit preferably further contains, as a coloring material, at least one organic pigment selected from the group consisting of C.I. Pigments Red 177, 242, 166, 167, and 179, C.I. Pigments Orange 38 and 71, and C.I. Pigments Yellow 150, 215, 185, 138, and 139.

In the RGB three-color pixel portions, the G pixel unit preferably further contains, as a coloring material, at least one organic dye/pigment selected from the group consisting of C.I. Pigments Yellow 150, 215, 185, and 138.

In the RGB three-color pixel portions, the B pixel unit preferably further contains, as a coloring material, at least one organic pigment selected from the group consisting of C.I. Pigment Blue 1 and C.I. Pigment Violet 23.

When the color filter is constituted by a black matrix, RGB three-color pixel portions, and a Y pixel unit, the Y pixel unit preferably contains, as a coloring material, a pigment having a water soluble matter of 1.5% or less and/or an electrical conductivity of 150 μS/cm or less. The water soluble matter is more preferably 1.0% or less, the electrical conductivity is more preferably 100 μS/cm or less, and yet more preferably the water soluble matter is 1.0% or less and the electrical conductivity is 100 μS/cm or less.

The Y pixel unit preferably contains, as a coloring material, at least one yellow organic dye or pigment selected from the group consisting of C.I. Pigments Yellow 150, 215, 185, 138, and 139.

The color filter pixel units of the color filter can be formed by a conventional method. An example of a typical method for forming pixel units is a photolithographic method. This method includes applying a photocurable composition described below to a black-matrix-side-surface of a color filter transparent substrate, heat-drying (prebaking) the applied composition, performing pattern exposure by irradiating the dried composition with UV light through a photomask to cure the photocurable compound in portions corresponding to the pixel units, developing the unexposed portions with a developer, and removing the non-pixel portions so that the pixel units are affixed to the transparent substrate. According to this method, pixel units formed of cured color films formed from the photocurable composition are formed on a transparent substrate.

A color filter having color pixel units for R pixels, G pixels, B pixels, and Y pixels at predetermined positions can be produced by repeating the above-described operation by using photocurable compositions described below for pixels of different colors, such as R pixels, G pixels, B pixels, and, if needed, Y pixels etc.

Examples of the method for applying photocurable compositions described below onto a transparent substrate such as glass include a spin coating method, a roll coating method, and an ink jet method.

The drying conditions for films of photocurable compositions applied to the transparent substrate differ depending on the types of the components, blend ratios, etc., but usually drying is conducted at 50° C. to 150° C. for about 1 to 15 minutes. The light used in photocuring of the photocurable composition is preferably ultraviolet light in the wavelength range of 200 to 500 nm or visible light. Various light sources that emit light within this wavelength range can be used.

Examples of the developing method include a puddle development method, a dipping method, and a spraying method. After exposure and development of the photocurable compositions, the transparent substrate on which pixel units of required colors have been formed is washed with water and dried. The resulting color filter is heat-treated (post-baked) for a particular time at 90° C. to 280° C. by using a heater such as a hot plate or an oven so as to remove volatile components in the color films and thermally cure the unreacted photocurable compound remaining in the cured color films of the photocurable compositions. As a result, a color filter is obtained.

A color filter coloring material of the present invention used in combination of the liquid crystal composition of the present invention prevents a decrease in voltage holding ratio (VHR) and an increase in ion density (ID) of the liquid crystal layer and it becomes possible to offer a liquid crystal display device that resolve the problems of display defects such as missing dots, alignment variation, and ghosting.

A typical method for preparing a photocurable composition includes using a dye and/or a pigment composition for a color filter according to the present invention, an organic solvent, and a dispersant as essential components, stirring and dispersing these essential components so as to form a homogeneous mixture to prepare a pigment dispersion for forming a pixel unit of a color filter, and adding a photocurable compound and, if needed, a thermoplastic resin, a photoinitiator, or the like to the pigment dispersion.

Examples of the organic solvent used here include aromatic solvents such as toluene, xylene, and methoxybenzene; acetate solvents such as ethyl acetate, propyl acetate, butyl acetate, propylene glycol monomethyl ether acetate, propylene glycol monoethyl ether acetate, diethylene glycol methyl ether acetate, diethylene glycol ethyl ether acetate, diethylene glycol propyl ether acetate, and diethylene glycol butyl ether acetate; propionate solvents such as ethoxyethyl propionate; alcohol solvents such as methanol and ethanol; ether solvents such as butyl cellosolve, propylene glycol monomethyl ether, diethylene glycol ethyl ether, and diethylene glycol dimethyl ether; ketone solvents such as methyl ethyl ketone, methyl isobutyl ketone, and cyclohexanone; aliphatic hydrocarbon solvents such as hexane, nitrogen compound solvents such as N,N-dimethylformamide, γ-butyrolactam, N-methyl-2-pyrrolidone, aniline, and pyridine; lactone solvents such as γ-butyrolactone; and carbamic acid esters such as a 48:52 mixture of methyl carbamate and ethyl carbamate.

Examples of the dispersant used here include dispersants such as DISPERBYK 130, DISPERBYK 161, DISPERBYK 162, DISPERBYK 163, DISPERBYK 170, DISPERBYK 171, DISPERBYK 174, DISPERBYK 180, DISPERBYK 182, DISPERBYK 183, DISPERBYK 184, DISPERBYK 185, DISPERBYK 2000, DISPERBYK 2001, DISPERBYK 2020, DISPERBYK 2050, DISPERBYK 2070, DISPERBYK 2096, DISPERBYK 2150, DISPERBYK LPN21116, and DISPERBYK LPN6919 produced by BYK Chemie, Efka 46, Efka 47, Efka 452, Efka LP4008, Efka 4009, Efka LP4010, Efka LP4050, LP4055, Efka 400, Efka 401, Efka 402, Efka 403, Efka 450, Efka 451, Efka 453, Efka 4540, Efka 4550, Efka LP4560, Efka 120, Efka 150, Efka 1501, Efka 1502, and Efka 1503 produced by Efka, SOLSPERSE 3000, SOLSPERSE 9000, SOLSPERSE 13240, SOLSPERSE 13650, SOLSPERSE 13940, SOLSPERSE 17000, 18000, SOLSPERSE 20000, SOLSPERSE 21000, SOLSPERSE 20000, SOLSPERSE 24000, SOLSPERSE 26000, SOLSPERSE 27000, SOLSPERSE 28000, SOLSPERSE 32000, SOLSPERSE 36000, SOLSPERSE 37000, SOLSPERSE 38000, SOLSPERSE 41000, SOLSPERSE 42000, SOLSPERSE 43000, SOLSPERSE 46000, SOLSPERSE 54000, and SOLSPERSE 71000 produced by The Lubrizol Corporation, and AJISPER PB711, AJISPER PB821, AJISPER PB822, AJISPER PB814, AJISPER PN411, and AJISPER PA111 produced by Ajinomoto Co., Inc.; and acrylic resins, urethane resins, alkyd resins, natural rosins such as wood rosin, rubber rosin, and tall oil rosin, modified rosins such as polymerized rosin, disproportionated rosin, hydrogenated rosin, oxidized rosin, and maleinized rosin, and synthetic resins that are liquid at room temperature and water-insoluble, such as rosin derivatives such as rosin amine, lime rosin, rosin alkylene oxide adducts, rosin alkyd adducts, and rosin-modified phenols. Addition of these dispersants and resins also contributes to decreasing flocculation, improving the pigment dispersion stability, and improving viscosity properties of the dispersion.

Phthalimidomethyl derivatives, sulfonic acid derivatives, N-(dialkylamino)methyl derivatives, and N-(dialkylaminoalkyl)sulfonic acid amide derivatives of organic pigments can be contained as the dispersion aid, for example. Naturally, two or more different kinds of these derivatives can be used in combination.

Examples of the thermoplastic resin used in preparing the photocurable compositions include urethane resins, acrylic resins, polyamide resins, polyimide resins, styrene maleic acid resins, and styrene maleic anhydride resins.

Examples of the photocurable compound include difunctional monomers such as such as 1,6-hexanediol diacrylate, ethylene glycol diacrylate, neopentyl glycol diacrylate, triethylene glycol diacrylate, bis(acryloxyethoxy)bisphenol A, and 3-methylpentanediol diacrylate, polyfunctional monomers having a relatively low molecular weight such as trimethylolpropane triacrylate, pentaerythritol triacrylate, tris[2-(meth)acryloyloxyethyl) isocyanurate, dipentaerythritol hexaacrylate, and dipentaerythritol pentaacrylate, and polyfunctional monomers having a relatively high molecular weight such as polyester acrylate, polyurethane acrylate, and polyether acrylate.

Examples of the photoinitiator include acetophenone, benzophenone, benzyl dimethyl ketal, benzoyl peroxide, 2-chlorothioxanthone, 1,3-bis(4'-azidobenzal)-2-propane, 1,3-bis(4'-azidobenzal)-2-propane-2'-sulfonic acid, and 4,4'-diazidostilbene-2,2'-disulfonic acid. Examples of commercially available photoinitiators include "Irgacure (trade name)-184", "Irgacure (trade name)-369", "Darocur (trade name)-1173", and "Lucirin-TPO" produced by BASF, "KAYACURE (trade name) DETX" and "KAYACURE (trade name) OA" produced by Nippon Kayaku Co., Ltd., "VICURE 10" and "VICURE 55" produced by Stauffer Company, "TRIGONAL PI" produced by Akzo Chemicals B.V., "Sandory 1000" produced by Sandoz, "DEAP" produced by Upjohn Co., Ltd., and "Biimidazole" produced by Kurogane Kasei Co., Ltd.

A known photosensitizer can be used in combination with the photoinitiator described above. Examples of the photosensitizer include amines, ureas, compounds containing sulfur atoms, compounds containing phosphorus atoms, compounds containing chlorine atoms, nitriles, and other compounds having nitrogen atoms. These can be used alone or in combination.

The blend ratio of the photoinitiator is not particularly limited but is preferably in the range of 0.1 to 30% on a mass basis relative to a photopolymerizable compound having a polymerizable or photocurable functional group. At a blend ratio less than 0.1%, sensitivity during photocuring tends to be low and at a blend ratio exceeding 30%, crystals of the photoinitiator precipitate when a film of a pigment dispersion resist is dried, sometimes resulting in deterioration of physical properties of the film.

By using the materials described, 300 to 1000 parts of the organic solvent and 1 to 100 parts of a dispersant per 100 parts of the dye and/or pigment composition for a color filter of the present invention on a mass basis are stirred and dispersed to homogeneity so that a dye/pigment solution is obtained. To this pigment dispersion, a total of 3 to 20 parts of a thermoplastic resin and a photocurable compound per part of the pigment composition for a color filter of the present invention, 0.05 to 3 parts of a photoinitiator per part of the photocurable compound, and, if needed, an organic solvent are added, and the resulting mixture is stirred and dispersed to homogeneity. As a result, a photocurable composition for forming a color filter pixel unit can be obtained.

A known common organic solvent or alkaline aqueous solution can be used as the developer. In particular, in the case where the photocurable composition contains a thermoplastic resin or a photocurable compound and at least one of them has an acid value and is alkali soluble, washing with an alkaline aqueous solution is effective for forming color filter pixel units.

Heretofore, a method for producing color filter pixel units by photolithography has been described in detail. However, color filter pixel units prepared by using pigment compositions for a color filter of the present invention may also be produced by forming pixel units of respective colors by other methods, such as an electrodeposition method, a transfer method, a micelle disruption method, a photovoltaic electrodeposition (PVED) method, an ink jet method, a reverse printing method, and a thermal curing method so as to make a color filter.

(Alignment Film)

In a liquid crystal display device of the present invention, a surface of a first substrate and a surface of a second substrate that contact the liquid crystal composition require alignment films for aligning the liquid crystal composition. In such a device, the alignment film is disposed between a color filter and a liquid crystal layer. The thickness of the alignment film is small, namely, 100 nm or less at most, and the alignment film does not completely block the interaction between the colorants such as pigments in the color filter and the liquid crystal compound in the liquid crystal layer.

In a liquid crystal display device that does not use alignment films, the interaction between the colorants such as pigments in the color filter and the liquid crystal compound in the liquid crystal layer is larger.

Transparent organic materials such as polyimide, polyamide, benzocyclobutene (BCB) polymers, and polyvinyl alcohol can be used as the alignment film materials. Particularly preferable is a polyimide alignment film obtained by imidizing a polyamic acid synthesized from a diamine, such as an aliphatic or alicyclic diamine such as p-phenylenediamine or 4,4'-diaminodiphenylmethane, and an aliphatic, alicyclic, or aromatic tetracarboxylic anhydride such as butanetetracarboxylic anhydride, 2,3,5-tricarboxycyclopentyl acetic anhydride, or pyromellitic dianhydride. In this case, the alignment is usually achieved by rubbing but the alignment film can be used without imparting alignment if it is to be used as a vertical alignment film or the like.

A compound containing chalcone, cinnamate, cinnamoyl, an azo group, or the like can be used as the material for the alignment films. These materials can be used in combination with other materials such as polyimide and polyamide. In such a case, the alignment film may be subject to rubbing or an optical alignment technique.

Typically, an alignment film is formed by forming a resin film by applying the alignment film material onto a substrate by a spin coating method or the like; however, a uniaxial stretching method, a Langmuir-Blodgett method or the like may also be employed.

(Transparent Electrode)

In the liquid crystal display device of the present invention, a conductive metal oxide can be used as the material for the transparent electrode. Examples of the metal oxide include indium oxide ($In_2O_3$), tin oxide ($SnO_2$), zinc oxide (ZnO), indium tin oxide ($In_2O_3$—$SnO_2$), indium zinc oxide ($In_2O_3$—ZnO), niobium-doped titanium dioxide ($Ti_{1-x}Nb_xO_2$), fluorine-doped tin oxide, graphene nanoribbon, and a metal nanowire. Zinc oxide (ZnO), indium tin oxide ($In_2O_3$—$SnO_2$), or indium zinc oxide ($In_2O_3$—ZnO) is preferable. A photo-etching method, a method that uses a mask, or the like can be employed to perform patterning on these transparent conductive films.

EXAMPLES

Some of the best embodiments of the present invention are described in detail by using Examples below. These examples do not limit the present invention. For the compositions of Examples and Comparative Examples, "%" means "% by mass".

The physical properties of the liquid crystal composition are referred to as follows:

$T_{N-I}$: nematic phase-isotropic liquid phase transition temperature (° C.), liquid crystal phase upper limit temperature $\Delta\epsilon$: dielectric anisotropy $\Delta n$: refractive index anisotropy $\eta$: viscosity (mPa·s) at 20° C.

$d_{gap}$: gap (μm) between a first substrate and a second substrate of a cell

VHR: voltage holding (%) ratio at 70° C.

(A liquid crystal composition was placed in a cell having a thickness of 3.5 μm and measurement was conducted under application of 5 V at a frame time of 200 ms and a pulse width of 64 μs. The percentage of the voltage observed in the measurement to the initial application voltage was assumed to be the voltage holding ratio.)

ID: ion density (pC/cm$^2$) at 70° C.

(A liquid crystal composition was placed in a cell having a thickness of 3.5 μm and the ion density measured by using MTR-1 (produced by Toyo Corporation) under application of 20 V at a frequency of 0.05 Hz was assumed to be ID.

The following abbreviations are used to indicate compounds:

n (numeral) at terminus $C_nH_{2n+1}$—

-2- —$CH_2CH_2$—

-1O— —$CH_2O$—

—O1- —$OCH_2$—

-On —$OC_nH_{2n+1}$

-1=1- —HC=CH—

—VO— —COO— ndM- $C_nH_{2n+1}$—HC=CH—$(CH_2)_{m-1}$—

[Chem. 29]

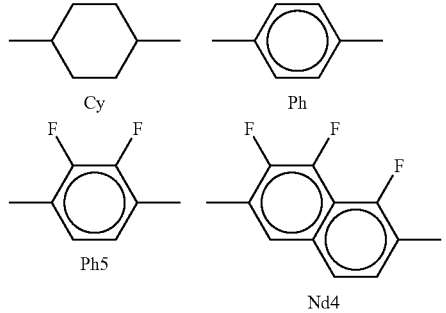

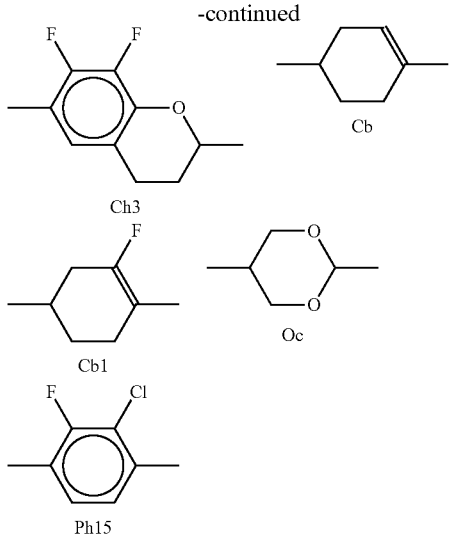

As for evaluation of ghosting of the liquid crystal display device, a particular fixed pattern was displayed in a display area for 1000 hours and then uniform display was performed in all parts of screen. The level of the afterimage of the fixed pattern observed with naked eye was rated according to the following four-grade scale.

AA: No after image
A: Faint afterimage was observed but the extent of the afterimage was acceptable.
B: Afterimage was observed and the extent of the afterimage was unacceptable.
C: Extensive afterimage was observed.

[Preparation of Color Filter]
[Preparation of Color Composition]
[Red Pigment Color Composition 1]

Into a polyethylene bottle, 10 parts of a red pigment 1 (C.I. Pigment Red 254, water soluble matter: 0.3%, electrical conductivity: 30 µS/cm) was placed. Thereto, 55 parts of propylene glycol monomethyl ether acetate, 7.0 parts of DISPERBYK LPN21116 (produced by BYK Chemie), and SEPR beads 0.3 to 0.4 mm in diameter were added. The resulting mixture was dispersed for 4 hours with a paint conditioner (produced by Toyo Seiki Seisaku-Sho Ltd.) and filtered through a 5 µm filter. As a result, a pigment dispersion was obtained. By using a disperser mixer, 75.00 parts of this pigment dispersion, 5.50 parts of a polyester acrylate resin (ARONIX (trademark) M7100 produced by TOA GOSEI CO., LTD.), 5.00 parts of dipentaerythritol hexaacrylate (KAYARAD (trademark) DPHA, produced by Nippon Kayaku Co., Ltd.), 1.00 part of benzophenone (KAYACURE (trademark) BP-100, produced by Nippon Kayaku Co., Ltd.), and 13.5 parts of UKAR ESTER EEP were stirred. The resulting mixture was filtered through a filter with 1.0 µm pore size. As a result, a red pigment color composition 1 was obtained.

The water soluble matter of the pigment was based on JIS K5101-16-1 (Test methods for pigments—Part 16: Matter soluble in water—Section 1: Hot extraction method)

The specific procedure was as follows:
1. Into a 500 mL hard beaker, exactly 5.00 g of a pigment is weighed, 200 mL of ion exchange water (conductivity: 5 µS/cm or less, pH=7.0±1.0) is gradually added at the beginning, and after 5 mL of a reagent 1st grade methanol is added to thoroughly wet the pigment, the rest of the ion exchange water is added, followed by boiling for 5 minutes.
2. The resulting product is cooled to room temperature, placed in a 250 mL measurement cylinder, and combined with the ion exchange water to adjust the amount to 250 mL; and the resulting mixture is thoroughly stirred and filtered through a No. 5C filter produced by Advantec.
3. About 50 mL of the filtrate that first flowed out is discarded, and 100 mL of the filtrate is weighed out from the rest and placed in an evaporating dish whose mass is known. The filtrate adhering to the measurement cylinder is washed into the evaporating dish with a small amount of ion exchange water.
4. The content of the evaporating dish is evaporated to dryness on a water bath, dried for 2 hours in a dryer maintained at 105° C. to 110° C., and placed in a desiccator. The mass after cooling is measured and the amount of the residue on evaporation is calculated.
5. The water soluble matter is calculated by using the following equation:

Water soluble matter (%) in pigment=amount (g) of residue on evaporation×2.5/mass (g) of pigment×100

The electrical conductivity of the pigment is measured as follows. After the electrical conductivity of ion exchange water is measured with a conductivity meter (model CM-30V produced by DKK-TOA CORPORATION, for example), the conductivity of the filtrate measured into a 100 mL measurement cylinder in paragraph 3 above is measured by using the same conductivity meter. The observed value is corrected by the following equation:

Electrical conductivity pigment=electrical conductivity of filtrate−electrical conductivity of ion exchange water used

[Red Pigment Color Composition 2]
A red pigment color composition 2 was obtained as described above except that a pigment mixture (water soluble matter: 0.4%, electrical conductivity: 30 µS/cm) containing 6 parts of the red pigment 1, 2 parts of a red pigment 2 (C.I. Pigment Red 177, water soluble matter: 0.5%, electrical conductivity: 40 µS/cm), and 2 parts of a yellow pigment 1 (C.I. Pigment Yellow 139, water soluble matter: 0.4%, electrical conductivity: 40 µS/cm) was used instead of 10 parts of the red pigment 1 in the red pigment color composition 1.

[Red Pigment Color Composition 3]
A red pigment color composition 3 was obtained as described above except 10 parts of a red pigment 3 (C.I. Pigment Red 255, water soluble matter: 0.6%, electrical conductivity: 60 µS/cm) was used instead of 10 parts of the red pigment 1 in the red pigment color composition 1.

[Red Pigment Color Composition 4]
A red pigment color composition 4 was obtained as described above except that a pigment mixture (water soluble matter: 0.2%, electrical conductivity: 30 µS/cm) containing 8 parts of a red pigment 4 (C.I. Pigment Red 264, water soluble matter: 0.2%, electrical conductivity: 25 µS/cm) and 2 parts of a yellow pigment 1 (C.I. Pigment Yellow 139, water soluble matter: 0.4%, electrical conductivity: 40 µS/cm) was used instead of 10 parts of the red pigment 1 in the red pigment color composition 1.

[Red Pigment Color Composition 5]
A red pigment color composition 5 was obtained as described above except 10 parts of a red pigment 5 (C.I. Pigment Red 48:1, water soluble matter: 1.6%, electrical conductivity: 170 μS/cm) was used instead of 10 parts of the red pigment 1 in the red pigment color composition 1.

[Green Pigment Color Composition 1]

A green pigment color composition 1 was obtained as described above except that a pigment mixture (water soluble matter: 0.4%, electrical conductivity: 50 μS/cm) containing 6 parts of a green pigment 1 (C.I. Pigment Green 36, water soluble matter: 0.3%, electrical conductivity: 40 μS/cm) and 4 parts of a yellow pigment 2 (C.I. Pigment Yellow 150, water soluble matter: 0.6%, electrical conductivity: 70 μS/cm) was used instead of 10 parts of the red pigment 1 in the red pigment color composition 1.

[Green Pigment Color Composition 2]

A green pigment color composition 2 was obtained as described above except that a pigment mixture (water soluble matter: 0.2%, electrical conductivity: 30 μS/cm) containing 4 parts of a green pigment 2 (C.I. Pigment Green 7, water soluble matter: 0.2%, electrical conductivity: 30 μS/cm) and 6 parts of a yellow pigment 3 (C.I. Pigment Yellow 138, water soluble matter: 0.2%, electrical conductivity: 30 μS/cm) was used instead of 6 parts of the green pigment 1 and 4 parts of the yellow pigment 2 in the green pigment color composition 1.

[Green Pigment Color Composition 3]

A green pigment color composition 3 was obtained as described above except that a pigment mixture (water soluble matter: 0.2%, electrical conductivity: 30 μS/cm) containing 6 parts of a green pigment 3 (C.I. Pigment Green 58 water soluble matter: 0.2%, electrical conductivity: 25 μS/cm) and 4 parts of a yellow pigment 3 (C.I. Pigment Yellow 138 water soluble matter: 0.2%, electrical conductivity: 30 μS/cm) was used instead of 6 parts of the green pigment 1 and 4 parts of the yellow pigment 2 in the green pigment color composition 1.

[Green pigment color composition 4]

A green pigment color composition 4 was obtained as described above except that a pigment mixture (water soluble matter: 0.7%, electrical conductivity: 80 μS/cm) containing 6 parts of a green pigment 3 (C.I. Pigment Green 58, water soluble matter: 0.2%, electrical conductivity: 25 μS/cm), 3.6 parts of a yellow pigment 3 (C.I. Pigment Yellow 138, water soluble matter: 0.2%, electrical conductivity: 30 μS/cm), and 0.4 part of a sulfonic acid derivative of YELLOW 138 described in Production Example 2 of Japanese Unexamined Patent Application Publication No. 2004-292785 was used instead of 6 parts of the green pigment 1 and 4 parts of the yellow pigment 2 in the green pigment color composition 1.

[Green pigment color composition 5]

A green pigment color composition 5 was obtained as described above except that a pigment mixture (water soluble matter: 1.8%, electrical conductivity: 190 μS/cm) containing 6 parts of a green pigment 4 (C.I. Pigment Green 4, water soluble matter: 1.7%, electrical conductivity: 180 μS/cm) and 4 parts of a yellow pigment 4 (C.I. Pigment Yellow 62, water soluble matter: 1.9%, electrical conductivity: 190 μS/cm) was used instead of 6 parts of the green pigment 1 and 4 parts of the yellow pigment 2 in the green pigment color composition 1.

[Blue Pigment Color Composition 1]

A blue pigment color composition 1 was obtained as described above except that a pigment mixture (water soluble matter: 0.3%, electrical conductivity: 30 μS/cm) containing 9 parts of a blue pigment 1 (C.I. Pigment Blue 15:6, water soluble matter: 0.2%, electrical conductivity: 20 μS/cm) and 1 part of a purple pigment 1 (C.I. Pigment Violet 23, water soluble matter: 0.7%, electrical conductivity: 80 μS/cm) was used instead of 10 parts of the red pigment 1 in the red pigment color composition 1.

[Blue Pigment Color Composition 2]

A blue pigment color composition 2 was obtained as described above except that the water soluble matter and the electrical conductivity of the blue pigment 1 in the blue pigment color composition 1 were adjusted to 0.5% and 50 μS/cm, respectively to obtain a blue pigment 2, and a pigment mixture (water soluble matter: 0.5%, electrical conductivity: 50 μS/cm) containing this blue pigment 2 instead of the blue pigment 1 was used.

[Blue Pigment Color Composition 3]

A blue pigment color composition 3 was obtained as described above except that 10 parts of a triarylmethane pigment represented by general formula (1) (compound No. 5 in Table 1, water soluble matter: 1.1%, electrical conductivity: 114 μS/cm) was used instead of 9 parts of the blue pigment 1 and 1 part of the purple pigment 1 in the blue pigment color composition 1.

[Blue Pigment Color Composition 4]

A blue pigment color composition 4 was obtained as described above except that 10 parts of a blue pigment 3 (C.I. Pigment Blue 1, water soluble matter: 1.3%, electrical conductivity: 160 μS/cm) was used instead of 9 parts of the blue pigment 1 and 1 part of the purple pigment 1 in the blue pigment color composition 1.

[Blue pigment color composition 5]

A blue pigment color composition 5 was obtained as described above except that 10 parts of a blue pigment 4 (C.I. Pigment Blue 61, water soluble matter: 1.8%, electrical conductivity: 200 μS/cm) was used instead of 9 parts of the blue pigment 1 and 1 part of the purple pigment 1 in the blue pigment color composition 1.

[Yellow Pigment Color Composition 1]

A yellow pigment color composition 1 was obtained as described above except that a pigment mixture (water soluble matter: 1.6%, electrical conductivity: 120 μS/cm) containing 9 parts of a yellow pigment 5 (C.I. Pigment Yellow 138, water soluble matter: 0.5%, electrical conductivity: 50 μS/cm) and 1 part of a sulfonic acid derivative of YELLOW 138 described in Production Example 2 of Japanese Unexamined Patent Application Publication No. 2004-292785 was used instead of 10 parts of the red pigment 1 of the red pigment color composition 1.

[Yellow pigment color composition 2]

A yellow pigment color composition 2 was obtained as described above except that 10 parts of a yellow pigment 2 (C.I. Pigment Yellow 150, water soluble matter: 0.6%, electrical conductivity: 70 μS/cm) was used instead of the yellow pigment 5 in the yellow pigment color composition 1 and the sulfonic acid derivative.

[Preparation of Color Filter]

Onto a glass substrate on which a black matrix had already been formed, a red color composition was applied to a thickness of 2 μm by spin coating. After drying at 70° C. for 20 minutes, stripe pattern exposure was conducted through a photomask by using an ultraviolet ray with a stepper equipped with an ultrahigh-pressure mercury lamp. Spray development was conducted with an alkaline developer for 90 seconds, followed by washing with ion exchange water and air drying. Then post baking was conducted at 230° C. for 30 minutes in a clean oven so as to form red pixels which are stripe-shaped color layers on the transparent substrate.

Next, a green color composition was applied to a thickness of 2 μm by spin coating. After drying, stripe-shaped color layers were formed at positions different from the red pixels by exposure and development using a stepper so as to form green pixels next to the red pixels.

Next, a blue color composition was applied to a thickness of 2 μm by spin coating so as to form blue pixels next to the red pixels and green pixels. As a result, a color filter having red, green, and blue stripe-shaped pixels was formed on the transparent substrate.

As needed, a yellow color composition was also applied to a thickness of 2 μm by spin coating so as to form yellow pixels next to the green pixels and blue pixels. As a result, a color filter having red, green, blue, and yellow stripe-shaped pixels was formed on the transparent substrate.

Color filters 1 to 4 and Comparative color filter 1 were prepared by using the dye color composition and the pigment color composition indicated in Table 8.

TABLE 8

|  | Color filter 1 | Color filter 2 | Color filter 3 | Color filter 4 | Comparative color filter 1 |
|---|---|---|---|---|---|
| R pixel unit | Red pigment color composition 1 | Red pigment color composition 2 | Red pigment color composition 3 | Red pigment color composition 4 | Red pigment color composition 5 |
| G pixel unit | Green pigment color composition 1 | Green pigment color composition 2 | Green pigment color composition 3 | Green pigment color composition 4 | Green pigment color composition 5 |
| B pixel unit | Blue pigment color composition 1 | Blue pigment color composition 2 | Blue pigment color composition 3 | Blue pigment color composition 4 | Blue pigment color composition 5 |
| Y pixel unit | None | Yellow pigment color composition 1 | None | Yellow pigment color composition 2 | Yellow pigment color composition 2 |

Examples 1 to 4

Electrode structures were formed on the first and second substrates. A vertical alignment film was formed on each of the surfaces that oppose each other and subjected to weak rubbing treatment to prepare a VA cell. A liquid crystal composition 1 having negative dielectric anisotropy indicated in Table 9 was placed between the first substrate and the second substrate. Next, color filters 1 to 4 indicated in Table 8 were used to produce liquid crystal display devices of Examples 1 to 4 ($d_{gap}$=3.5 μm, alignment film: SE-5300). The VHR and ID of the liquid crystal display devices were measured. Ghosting evaluation was also conducted on the liquid crystal display devices. The results are indicated in Table 10.

TABLE 9

|  | Liquid crystal composition 1 |
|---|---|
| 0d1-Cy-Cy-3 | 20 |
| 3-Cy-Cy-2 | 15 |
| 3-Cy-Ph—O1 | 5 |
| 0d1-Cy-1O—Ph5—O1-Cy-2 | 11 |
| 0d1-Cy-1O—Ph5—O1-Cy-3 | 11 |
| 0d1-Cy-1O—Ph5—O1-Cy-4 | 11 |
| 0d1-Cy-1O—Ph5—O1-Cy-5 | 11 |
| 0d1-Cy-Cy-1O—Ph5—O3d0 | 4 |
| 0d1-Cy-1O—Ph5—O4d0 | 4 |
| 0d1-Cy-1O—Ph5—O1-Cy-Cy-2 | 4 |
| 0d1-Cy-1O—Ph5—O1-Cy-Cy-3 | 4 |
| Total (%) | 100 |
| Tni/° C. | 82.4 |
| Δn(20° C.) | 0.074 |
| η20/mPa · s | 16.1 |
| Δε(20° C.) | −4.7 |

TABLE 10

|  | Example 1 | Example 2 | Example 3 | Example 4 |
|---|---|---|---|---|
| Liquid crystal composition | Liquid crystal composition 1 | Liquid crystal composition 1 | Liquid crystal composition 1 | Liquid crystal composition 1 |
| Color filter | Color filter 1 | Color filter 2 | Color filter 3 | Color filter 4 |
| VHR | 99.5 | 99.4 | 99.1 | 99.0 |
| ID | 16 | 23 | 65 | 77 |
| Ghosting | AA | AA | A | A |

Liquid crystal display devices of Examples 1 to 4 achieved high VHR and low ID. As for ghosting evaluation, either no afterimage was observed or afterimage was faint and at an acceptable level.

Comparative Examples 1 to 8

A comparative liquid crystal composition 1 and a comparative liquid crystal composition 2 having negative dielectric anisotropy indicated in Table 11 were placed in VA cells used in Example 1. The color filters 1 to 4 indicated in Table 8 were used to make liquid crystal display devices of Comparative Examples 1 to 8. VHR and ID of the liquid crystal display devices were measured. Ghosting evaluation was conducted on the liquid crystal display devices. The results are indicated in Tables 12 and 13.

TABLE 11

|  | Comparative liquid crystal composition 1 | Comparative liquid crystal composition 2 |
|---|---|---|
| 0d1-Cy-Cy-3 | 20 | 20 |
| 3-Cy-Cy-2 | 15 | 14 |
| 3-Cy-Ph—O1 | 5 | 5 |
| 0d1-Cy-1O—Ph15—O1-Cy-2 | 8 | 8 |
| 0d1-Cy-1O—Ph15—O1-Cy-3 | 8 | 8 |
| 0d1-Cy-1O—Ph15—O1-Cy-4 | 10 | 10 |
| 0d1-Cy-1O—Ph15—O1-Cy-5 | 10 | 10 |
| 0d1-Cy-Cy-1O—Ph15—O3d0 | 4 | 4 |
| 0d1-Cy-Cy-1O—Ph15—O4d0 | 4 | 4 |
| 0d1-Cy-1O—Ph15—O1-Cy-Cy-2 | 4 | 4 |
| 0d1-Cy-1O—Ph15—O1-Cy-Cy-3 | 4 | 4 |
| 3-Cy-Oc-Ph15—O1 |  | 8 |
| 3-Cy-Cb1-Ph15—O2 | 3 |  |
| 5-Cy-Cb1-Ph15—O2 | 3 |  |
| 5-Cy-Cb-Ph15—O2 | 2 |  |
| Total (%) | 100 | 100 |
| Tni/° C. | 81.9 | 81.3 |

TABLE 11-continued

|  | Comparative liquid crystal composition 1 | Comparative liquid crystal composition 2 |
|---|---|---|
| Δn (20° C.) | 0.073 | 0.074 |
| η20/mPa · s | 17.3 | 16.8 |
| Δε (20° C.) | −4.6 | −4.7 |

TABLE 12

|  | Comparative Example 1 | Comparative Example 2 | Comparative Example 3 | Comparative Example 4 |
|---|---|---|---|---|
| Liquid crystal composition | Comparative liquid crystal composition 1 | Comparative liquid crystal composition 1 | Comparative liquid crystal composition 1 | Comparative liquid crystal composition 1 |
| Color filter | Color filter 1 | Color filter 2 | Color filter 3 | Color filter 4 |
| VHR | 98.6 | 98.4 | 98.3 | 98.0 |
| ID | 118 | 125 | 140 | 153 |
| Ghosting | B | C | C | C |

TABLE 13

|  | Comparative Example 5 | Comparative Example 6 | Comparative Example 7 | Comparative Example 8 |
|---|---|---|---|---|
| Liquid crystal composition | Comparative liquid crystal composition 2 | Comparative liquid crystal composition 2 | Comparative liquid crystal composition 2 | Comparative liquid crystal composition 2 |
| Color filter | Color filter 1 | Color filter 2 | Color filter 3 | Color filter 4 |
| VHR | 98.5 | 98.4 | 98.2 | 97.9 |
| ID | 121 | 127 | 145 | 160 |
| Ghosting | C | C | C | C |

Compared to the liquid crystal display devices of the invention of the present application, the liquid crystal display devices of Comparative Examples 1 to 8 had low VHR and high ID. In the ghosting evaluation, afterimage that were not at an acceptable level occurred.

Comparative Example 9

A liquid crystal composition 1 having negative dielectric anisotropy indicated in Table 9 was placed in a VA cell used in Example 1, and a liquid crystal display device of Comparative Example 9 was formed by using a comparative color filter 1 indicated in Table 8. The VHR and ID thereof were measured. Ghosting evaluation was conducted on the liquid crystal display device. The results are indicated in Table 14.

TABLE 14

|  | Comparative Example 9 |
|---|---|
| Liquid crystal composition | Liquid crystal composition 1 |
| Color filter | Comparative color filter 1 |
| VHR | 97.3 |
| ID | 218 |
| Ghosting | C |

Compared to the liquid crystal display devices of the invention of the present application, the liquid crystal display device of Comparative Example 9 had low VHR and high ID. In the ghosting evaluation, afterimage not at an acceptable level occurred.

Comparative Examples 10 to 13

A comparative liquid crystal composition 3 having negative dielectric anisotropy indicated in Table 15 was placed as in Example 1 and liquid crystal display devices of Comparative Examples 10 to 13 were prepared by using the color filters 1 to 4 indicated in Table 8. The VHR and ID thereof were measured. Ghosting evaluation was also conducted on the liquid crystal display devices. The results are indicated in Table 16.

TABLE 15

|  | Comparative liquid crystal composition 3 |
|---|---|
| 3-Cy-Ph15—O4 | 11 |
| 5-Cy-Ph15—O4 | 11 |
| 2-Cy-Cy-Ph15-1 | 12 |
| 2-Cy-Cy-Ph15—O2 | 9 |
| 3-Cy-Cb1-Ph15—O2 | 4 |
| 3-Cy-Cy-Ph15-1 | 12 |
| 3-Cy-Cy-Ph15—O2 | 9 |
| 5-Cy-Cb1-Ph15—O2 | 6 |
| 5-Cy-Cb-Ph15—O2 | 18 |
| 5-Cy-Cy-Ph15—O2 | 8 |
| Total (%) | 100 |
| Tni/° C. | 118.1 |
| Δn (20° C.) | 0.105 |
| ne (20° C.) | 1.586 |
| Δε (20° C.) | −6.4 |
| ε⊥ (20° C.) | 10.4 |
| K3/K1 (20° C.) | 1.05 |
| K1/pN (20° C.) | 20.2 |

TABLE 16

|  | Comparative Example 10 | Comparative Example 11 | Comparative Example 12 | Comparative Example 13 |
|---|---|---|---|---|
| Liquid crystal composition | Comparative liquid crystal composition 3 | Comparative liquid crystal composition 3 | Comparative liquid crystal composition 3 | Comparative liquid crystal composition 3 |
| Color filter | Color filter 1 | Color filter 2 | Color filter 3 | Color filter 4 |
| VHR | 98.4 | 98.3 | 98.2 | 98.0 |
| ID | 122 | 129 | 147 | 164 |
| Ghosting | B | C | C | C |

Compared to the liquid crystal display devices of the invention of the present application, the liquid crystal display devices of Comparative Examples 10 to 13 had low VHR and high ID. In the ghosting evaluation, afterimage not at an acceptable level occurred.

Examples 5 to 12

Liquid crystal display devices of Examples 5 to 12 were prepared as in Example 1 by using negative dielectric anisotropy liquid crystals indicated in Table 17 and the color filters 1 to 4 indicated in Table 8. The VHR and ID thereof were measured. Ghosting evaluation was conducted on the liquid crystal display devices. The results are indicated in Tables 18 and 19.

TABLE 17

|  | Liquid crystal composition 2 | Liquid crystal composition 3 |
|---|---|---|
| 3-Cy-1O—Ph5—O2 | 11 | 11 |
| 5-Cy-1O—Ph5—O2 | 10 | 10 |

TABLE 17-continued

|  | Liquid crystal composition 2 | Liquid crystal composition 3 |
|---|---|---|
| 0d1-Cy-Cy-3 | 20 |  |
| 0d1-Cy-Cy-5 |  | 20 |
| 0d3-Cy-Cy-3 | 10 | 10 |
| 3-Cy-1 = 1-Cy-3 | 10 | 10 |
| 0d1-Cy-1O—Ph5—O1-Cy-3 |  | 5 |
| 0d1-Cy-Cy-1O—Ph5—O3d0 |  | 5 |
| 0d1-Cy-Cy-1O—Ph5—O4d0 |  | 5 |
| 2-Cy-Cy-1O—Ph5—O2 | 5 | 5 |
| 3-Cy-Cy-1O—Ph5—O2 | 12 | 12 |
| 4-Cy-Cy-1O—Ph5—O2 | 5 | 5 |
| 0d1-Cy-1O—Ph5—O1-Cy-Cy-1d0 | 12 |  |
| 0d1-Cy-1O—Ph5—O1-Cy-Cy-2 | 5 |  |
| 0d1-Cy-1O—Ph5—O1-Cy-Cy-3 |  | 2 |
| Total (%) | 100 | 100 |
| Tni/° C. | 79.6 | 78.9 |
| Δn(20° C.) | 0.074 | 0.075 |
| η20/mPa · s | 17.8 | 18.2 |
| Δε(20° C.) | −4.8 | −4.8 |

TABLE 18

|  | Example 5 | Example 6 | Example 7 | Example 8 |
|---|---|---|---|---|
| Liquid crystal composition | Liquid crystal composition 2 | Liquid crystal composition 2 | Liquid crystal composition 2 | Liquid crystal composition 2 |
| Color filter | Color filter 1 | Color filter 2 | Color filter 3 | Color filter 4 |
| VHR | 99.6 | 99.4 | 99.3 | 99.2 |
| ID | 15 | 25 | 36 | 60 |
| Ghosting | AA | AA | AA | AA |

TABLE 19

|  | Example 9 | Example 10 | Example 11 | Example 12 |
|---|---|---|---|---|
| Liquid crystal composition | Liquid crystal composition 3 | Liquid crystal composition 3 | Liquid crystal composition 3 | Liquid crystal composition 3 |
| Color filter | Color filter 1 | Color filter 2 | Color filter 3 | Color filter 4 |
| VHR | 99.6 | 99.4 | 99.2 | 99.1 |
| ID | 19 | 25 | 63 | 72 |
| Ghosting | AA | AA | AA | A |

The liquid crystal display devices of Examples 5 to 12 had high VHR and low ID. In the ghosting evaluation, either no afterimage was observed or afterimage was faint and at an acceptable level.

Examples 13 to 28

Liquid crystal display devices of Examples 13 to 28 were prepared as in Example 1 by using negative dielectric anisotropy liquid crystals indicated in Table 20 and the color filters 1 to 4 indicated in Table 8. The VHR and ID thereof were measured. Ghosting evaluation was conducted on the liquid crystal display devices. The results are indicated in Tables 21 to 24.

TABLE 20

|  | Liquid crystal composition 4 | Liquid crystal composition 5 | Liquid crystal composition 6 | Liquid crystal composition 7 |
|---|---|---|---|---|
| 0d1-Cy-1O—Ph5—O3d0 |  |  |  | 5 |
| 0d1-Cy-1O—Ph5—O4d0 |  |  |  | 5 |
| 0d1-Cy-Cy-3 | 10 |  |  | 4 |
| 3-Cy-Cy-2 | 10 | 18 |  | 10 |
| 3-Cy-Cy-4 |  | 6 | 15 | 3 |
| 3-Cy-Ph—O2 | 12 | 12 | 15 | 4 |
| 5-Ph-Ph-1 | 10 | 3 | 3 | 10 |
| 0d1-Cy-1O—Ph5—O1-Cy-2 | 10 | 10 | 10 |  |
| 0d1-Cy-1O—Ph5—O1-Cy-3 | 12 | 12 | 12 |  |
| 0d1-Cy-1O—Ph5—O1-Cy-4 | 12 | 12 | 12 |  |
| 0d1-Cy-1O—Ph5—O1-Cy-5 | 10 | 10 | 10 |  |
| 0d1-Cy-Cy-1O—Ph5—O1d0 |  |  |  | 10 |
| 0d1-Cy-Cy-1O—Ph5—O2d0 |  |  |  | 10 |
| 0d1-Cy-Cy-1O—Ph5—O3d0 |  |  |  | 15 |
| 0d1-Cy-Cy-1O—Ph5—O4d0 |  |  |  | 15 |
| 3-Cy-Cy-Ph-1 | 6 | 3 |  | 6 |
| 0d1-Cy-1O—Ph5—O1-Cy-Cy-2 | 4 | 4 | 4 |  |
| 0d1-Cy-1O—Ph5—O1-Cy-Cy-3 | 4 | 4 | 4 |  |
| Total (%) | 100 | 100 | 100 | 100 |
| Tni/° C. | 75.5 | 81.8 | 83.5 | 75.1 |
| Δn (20° C.) | 0.088 | 0.077 | 0.078 | 0.087 |
| η20/mPa · s | 16 | 16.5 | 20.2 | 15.5 |
| Δε (20° C.) | −4.2 | −4.2 | −4.2 | −4.3 |

TABLE 21

|  | Example 13 | Example 14 | Example 15 | Example 16 |
|---|---|---|---|---|
| Liquid crystal composition | Liquid crystal composition 4 | Liquid crystal composition 4 | Liquid crystal composition 4 | Liquid crystal composition 4 |
| Color filter | Color filter 1 | Color filter 2 | Color filter 3 | Color filter 4 |
| VHR | 99.5 | 99.4 | 99.1 | 99.0 |
| ID | 18 | 27 | 59 | 72 |
| Ghosting | AA | AA | AA | AA |

TABLE 22

|  | Example 17 | Example 18 | Example 19 | Example 20 |
|---|---|---|---|---|
| Liquid crystal composition | Liquid crystal composition 5 | Liquid crystal composition 5 | Liquid crystal composition 5 | Liquid crystal composition 5 |
| Color filter | Color filter 1 | Color filter 2 | Color filter 3 | Color filter 4 |
| VHR | 99.5 | 99.4 | 99.2 | 99.1 |
| ID | 16 | 21 | 60 | 73 |
| Ghosting | AA | AA | AA | A |

TABLE 23

|  | Example 21 | Example 22 | Example 23 | Example 24 |
|---|---|---|---|---|
| Liquid crystal composition | Liquid crystal composition 6 | Liquid crystal composition 6 | Liquid crystal composition 6 | Liquid crystal composition 6 |
| Color filter | Color filter 1 | Color filter 2 | Color filter 3 | Color filter 4 |
| VHR | 99.7 | 99.5 | 99.3 | 99.2 |
| ID | 15 | 20 | 49 | 61 |
| Ghosting | AA | AA | AA | AA |

TABLE 24

|  | Example 25 | Example 26 | Example 27 | Example 28 |
|---|---|---|---|---|
| Liquid crystal composition | Liquid crystal composition 7 | Liquid crystal composition 7 | Liquid crystal composition 7 | Liquid crystal composition 7 |
| Color filter | Color filter 1 | Color filter 2 | Color filter 3 | Color filter 4 |
| VHR | 99.5 | 99.3 | 99.1 | 99.0 |
| ID | 21 | 48 | 64 | 74 |
| Ghosting | AA | AA | A | A |

The liquid crystal display devices of Examples 13 to 28 had high VHR and low ID. In the ghosting evaluation, either no afterimage was observed or afterimage was faint and at an acceptable level.

Examples 29 to 40

Liquid crystal display devices of Examples 29 to 40 were prepared as in Example 1 by using negative dielectric anisotropy liquid crystals indicated in Table 25 and the color filters 1 to 4 indicated in Table 8. The VHR and ID thereof were measured. Ghosting evaluation was also conducted on the liquid crystal display devices. The results are indicated in Tables 26 to 28.

TABLE 25

|  | Liquid crystal composition 8 | Liquid crystal composition 9 | Liquid crystal composition 10 |
|---|---|---|---|
| 2-Cy-2-Nd4—O2 |  | 4 | 4 |
| 2-Cy-2-Nd4—O4 |  | 4 | 4 |
| 3-Cy-1O-Ch3-5 | 3 |  |  |
| 3-Cy-1O—Nd4—O4 | 3 | 4 | 4 |
| 5-Cy-1O-Ch3-5 | 3 |  |  |
| 5-Cy-1O—Nd4—O2 | 2 |  |  |
| 5-Cy-1O—Nd4—O3 | 3 | 4 | 4 |
| Od1-Cy-Cy-5 |  | 23 |  |
| Od3-Cy-Cy-3 |  | 10 |  |
| 1d1-Cy-Cy-3 |  | 8 |  |
| 3-Cy-Cy-2 | 15 |  |  |
| 3-Cy-Cy-4 | 7 | 6 | 22 |
| 3-Cy-Cy-5 | 7 |  | 22 |
| 3-Cy-Ph-2 |  | 15 | 15 |
| 3-Cy-Ph—O1 | 5 |  |  |
| 3-Cy-Ph—O2 | 5 |  |  |
| 5-Ph-Ph-1 | 6 |  |  |
| 2-Cy-Cy-1O—Nd4—O2 | 3 | 4 | 4 |
| 2-Cy-Cy-1O—Nd4—O4 | 2 | 4 | 4 |
| 3-Cy-2-Cy-1O—Nd4—O2 | 4 |  |  |
| 3-Cy-2-Cy-1O—Nd4—O3 | 4 |  |  |
| 3-Cy-Cy-1O-Ch3-5 | 3 |  |  |
| 3-Cy-Cy-1O—Nd4—O4 | 3 | 4 | 4 |
| 4-Cy-Cy-1O-Ch3-5 | 3 |  |  |
| 4-Cy-Cy-1O—Nd4—O2 | 2 | 4 | 4 |
| 4-Cy-Cy-2-Nd4—O2 |  | 6 | 6 |
| 3-Cy-Cy-Ph-1 | 8 |  | 3 |
| Total (%) | 100 | 100 | 100 |
| Tni/° C. | 92 | 90 | 91 |
| Δn (20° C.) | 0.093 | 0.092 | 0.093 |
| η20/mPa · s | 24.9 | 24.1 | 25.5 |
| Δε (20° C.) | −3.3 | −3.2 | −3.2 |

TABLE 26

|  | Example 29 | Example 30 | Example 31 | Example 32 |
|---|---|---|---|---|
| Liquid crystal composition | Liquid crystal composition 8 | Liquid crystal composition 8 | Liquid crystal composition 8 | Liquid crystal composition 8 |
| Color filter | Color filter 1 | Color filter 2 | Color filter 3 | Color filter 4 |
| VHR | 99.7 | 99.5 | 99.2 | 98.9 |
| ID | 14 | 25 | 79 | 89 |
| Ghosting | AA | AA | A | A |

TABLE 27

|  | Example 33 | Example 34 | Example 35 | Example 36 |
|---|---|---|---|---|
| Liquid crystal composition | Liquid crystal composition 9 | Liquid crystal composition 9 | Liquid crystal composition 9 | Liquid crystal composition 9 |
| Color filter | Color filter 1 | Color filter 2 | Color filter 3 | Color filter 4 |
| VHR | 99.6 | 99.4 | 99.2 | 99.1 |
| ID | 19 | 26 | 51 | 66 |
| Ghosting | AA | AA | AA | A |

TABLE 28

|  | Example 37 | Example 38 | Example 39 | Example 40 |
|---|---|---|---|---|
| Liquid crystal composition | Liquid crystal composition 10 | Liquid crystal composition 10 | Liquid crystal composition 10 | Liquid crystal composition 10 |
| Color filter | Color filter 1 | Color filter 2 | Color filter 3 | Color filter 4 |
| VHR | 99.5 | 99.4 | 99.2 | 99.1 |
| ID | 21 | 26 | 62 | 73 |
| Ghosting | AA | AA | A | A |

The liquid crystal display devices of Examples 29 to 40 had high VHR and low ID. In the ghosting evaluation, either no afterimage was observed or afterimage was faint and at an acceptable level.

Examples 41 to 48

Liquid crystal display devices of Examples 41 to 48 were prepared as in Example 1 by using negative dielectric anisotropy liquid crystals indicated in Table 29 and the color filters 1 to 4 indicated in Table 8. The VHR and ID thereof were measured. Ghosting evaluation was also conducted on the liquid crystal display devices. The results are indicated in Tables 30 and 31.

TABLE 29

|  | Liquid crystal composition 11 | Liquid crystal composition 12 |
|---|---|---|
| 3-Cy-1O-Ch3-5 | 2 |  |
| 3-Cy-2-Ph5—O2 | 6 | 10 |
| 3-Cy-Ph5—O2 |  | 10 |
| 4-Cy-1O—Nd4—O2 | 5 | 5 |
| 5-Cy-1O-Ch3-5 | 2 |  |
| 0d1-Cy-Cy-5 |  | 16 |
| 3-Cy-1 = 1-Cy-3 |  | 10 |
| 3-Cy-Cy-2 | 15 |  |
| 3-Cy-Cy-4 | 7 |  |
| 3-Cy-Cy-5 | 7 |  |
| 3-Cy-Ph—O1 | 6 |  |
| 3-Cy-2-Cy-1O—Nd4—O2 | 3 |  |
| 3-Cy-2-Cy-1O—Nd4—O3 | 3 |  |
| 3-Cy-Cy-1O-Ch3-5 | 2 |  |
| 3-Cy-Cy-2-Ph5—O2 | 7 | 10 |
| 3-Cy-Cy-Ph5-1 | 7 | 10 |
| 3-Cy-Cy-Ph5—O2 | 7 | 10 |
| 4-Cy-Cy-1O-Ch3-5 | 2 |  |
| 5-Cy-Cy-1O—Nd4—O3 | 5 | 5 |
| 0d1-Cy-Cy-Ph-1 |  | 14 |
| 3-Cy-Cy-Ph-1 | 14 |  |
| Total | 100 | 100 |
| Tni/° C. | 87 | 85 |
| Δn (20° C.) | 0.086 | 0.085 |
| η20/mPa · s | 24.2 | 23.8 |
| Δε (20° C.) | −2.7 | −2.5 |

TABLE 30

|  | Example 41 | Example 42 | Example 43 | Example 44 |
|---|---|---|---|---|
| Liquid crystal composition | Liquid crystal composition 11 | Liquid crystal composition 11 | Liquid crystal composition 11 | Liquid crystal composition 11 |
| Color filter | Color filter 1 | Color filter 2 | Color filter 3 | Color filter 4 |
| VHR | 99.7 | 99.6 | 99.3 | 99.2 |
| ID | 13 | 18 | 39 | 58 |
| Ghosting | AA | AA | AA | AA |

TABLE 31

|  | Example 45 | Example 46 | Example 47 | Example 48 |
|---|---|---|---|---|
| Liquid crystal composition | Liquid crystal composition 12 | Liquid crystal composition 12 | Liquid crystal composition 12 | Liquid crystal composition 12 |
| Color filter | Color filter 1 | Color filter 2 | Color filter 3 | Color filter 4 |
| VHR | 99.7 | 99.5 | 99.3 | 99.1 |
| ID | 12 | 22 | 42 | 62 |
| Ghosting | AA | AA | AA | AA |

The liquid crystal display devices of Examples 41 to 48 had high VHR and low ID. In the ghosting evaluation, either no afterimage was observed or afterimage was faint and at an acceptable level.

Examples 49 to 60

Liquid crystal display devices of Examples 49 to 60 were prepared as in Example 1 by using negative dielectric anisotropy liquid crystals indicated in Table 32 and the color filters 1 to 4 indicated in Table 8. The VHR and ID thereof were measured. Ghosting evaluation was also conducted on the liquid crystal display devices. The results are indicated in Tables 33 to 35.

TABLE 32

|  | Liquid crystal composition 13 | Liquid crystal composition 14 | Liquid crystal composition 15 |
|---|---|---|---|
| 3-Cy-1O—Ch3-5 | 3 |  |  |
| 3-Cy-1O—Nd4—O4 | 3 |  | 4 |
| 5-Cy-1O—Ch3-5 | 3 |  |  |
| 5-Cy-1O—Nd4—O2 | 2 | 4 | 4 |
| 5-Cy-1O—Nd4—O3 | 3 | 4 | 4 |
| 3-Cy-Cy-2 | 7 | 21 | 11 |
| 3-Cy-Cy-4 | 11 | 7 | 7 |
| 3-Cy-Cy-5 | 11 | 7 | 7 |
| 3-Cy-Ph-2 |  |  | 6 |
| 3-Cy-Ph—O1 | 7 | 13 | 7 |
| 3-Cy-Ph—O2 | 7 | 13 | 7 |
| 5-Ph—Ph-1 | 6 |  | 13 |
| 2-Cy-Cy-1O—Nd4—O2 | 3 | 4 | 4 |
| 2-Cy-Cy-1O—Nd4—O4 | 2 |  |  |
| 3-Cy-2-Cy-1O—Nd4—O2 | 3 | 4 | 4 |
| 3-Cy-2-Cy-1O—Nd4—O3 | 3 | 4 | 4 |
| 3-Cy-Cy-1O—Ch3-5 | 2 | 3 |  |
| 3-Cy-Cy-1O—Nd4—O4 | 3 | 4 | 4 |
| 4-Cy-Cy-1O—Ch3-5 | 2 | 3 |  |
| 4-Cy-Cy-1O—Nd4—O2 | 2 |  |  |
| 3-Cy-Cy-Ph-1 | 8 | 9 | 6 |
| 3-Cy-Ph—Ph-1 | 9 |  | 6 |
| Total (%) | 100 | 100 | 98 |
| Tni/° C. | 86 | 81 | 76 |
| Δn (20° C.) | 0.091 | 0.082 | 0.104 |
| η20/mPa · s | 20 | 19.2 | 17.8 |
| Δε (20° C.) | −2.7 | −2.5 | −2.3 |

TABLE 33

|  | Example 49 | Example 50 | Example 51 | Example 52 |
|---|---|---|---|---|
| Liquid crystal composition | Liquid crystal composition 13 | Liquid crystal composition 13 | Liquid crystal composition 13 | Liquid crystal composition 13 |
| Color filter | Color filter 1 | Color filter 2 | Color filter 3 | Color filter 4 |
| VHR | 99.5 | 99.4 | 99.2 | 99.1 |
| ID | 20 | 25 | 49 | 65 |
| Ghosting | AA | AA | AA | A |

TABLE 34

|  | Example 53 | Example 54 | Example 55 | Example 56 |
|---|---|---|---|---|
| Liquid crystal composition | Liquid crystal composition 14 | Liquid crystal composition 14 | Liquid crystal composition 14 | Liquid crystal composition 14 |
| Color filter | Color filter 1 | Color filter 2 | Color filter 3 | Color filter 4 |
| VHR | 99.5 | 99.4 | 99.2 | 99.0 |
| ID | 19 | 25 | 53 | 75 |
| Ghosting | AA | AA | AA | A |

TABLE 35

|  | Example 57 | Example 58 | Example 59 | Example 60 |
|---|---|---|---|---|
| Liquid crystal composition | Liquid crystal composition 15 | Liquid crystal composition 15 | Liquid crystal composition 15 | Liquid crystal composition 15 |
| Color filter | Color filter 1 | Color filter 2 | Color filter 3 | Color filter 4 |
| VHR | 99.5 | 99.4 | 99.1 | 99.0 |
| ID | 19 | 24 | 57 | 77 |
| Ghosting | AA | AA | A | A |

The liquid crystal display devices of Examples 49 to 60 had high VHR and low ID. In the ghosting evaluation, either no afterimage was observed or afterimage was faint and at an acceptable level.

Examples 61 to 76

Liquid crystal display devices of Examples 61 to 76 were prepared as in Example 1 by using negative dielectric anisotropy liquid crystals indicated in Table 36 and the color filters 1 to 4 indicated in Table 8. The VHR and ID thereof were measured. Ghosting evaluation was also conducted on the liquid crystal display devices. The results are indicated in Tables 37 to 40.

TABLE 36

|  | Liquid crystal composition 16 | Liquid crystal composition 17 | Liquid crystal composition 18 | Liquid crystal composition 19 |
|---|---|---|---|---|
| 3-Cy-1O—Ph5—O2 |  | 2 |  | 11 |
| 5-Cy-1O—Ph5—O2 |  | 2 |  | 10 |
| 0d1-Cy-Cy-3 |  |  | 30 |  |
| 0d1-Cy-Cy-5 | 4 | 4 | 10 | 20 |
| 0d3-Cy-Cy-3 |  |  |  | 10 |
| 3-Cy-1 = 1-Cy-3 |  |  |  | 10 |
| 3-Cy-Cy-2 | 4 | 4 |  |  |
| 3-Cy-Cy-4 | 4 | 4 |  |  |
| 3-Cy-Cy-5 | 4 | 4 |  |  |
| 3-Cy-Ph—O1 | 2 | 2 |  |  |
| 5-Ph—Ph-1 | 20 | 20 |  |  |
| 0d1-Cy-1O—Ph5—O1-Cy-1d0 |  |  |  | 12 |
| 0d1-Cy-1O—Ph5—O1-Cy-2 | 7 | 8 | 10 |  |
| 0d1-Cy-1O—Ph5—O1-Cy-3 | 7 | 8 | 12 |  |
| 0d1-Cy-1O—Ph5—O1-Cy-4 | 7 | 8 | 12 |  |
| 0d1-Cy-1O—Ph5—O1-Cy-5 | 5 |  | 10 |  |
| 0d1-Cy-Cy-1O—Ph5—O3d0 | 13 |  | 6 |  |
| 0d1-Cy-Cy-1O—Ph5—O4d0 | 13 |  | 6 |  |
| 2-Cy-Cy-1O—Ph5—O2 |  | 13 |  | 5 |
| 3-Cy-Cy-1O—Ph5—O2 |  | 13 |  | 12 |
| 4-Cy-Cy-1O—Ph5—O2 |  | 13 |  | 5 |
| 0d1-Cy-1O—Ph5—O1-Cy-Cy-2 | 5 |  | 2 | 5 |
| 0d1-Cy-1O—Ph5—O1-Cy-Cy-3 | 5 | 5 | 2 |  |
| Total (%) | 100 | 110 | 100 | 100 |
| Tni/° C. | 80.5 | 79.8 | 83.6 | 83.1 |
| Δn (20° C.) | 0.102 | 0.101 | 0.075 | 0.075 |
| η20/mPa · s | 23.9 | 27.6 | 15.1 | 18 |
| Δε (20° C.) | −4.1 | −4.1 | −4.8 | −4.8 |

TABLE 37

|  | Example 61 | Example 62 | Example 63 | Example 64 |
|---|---|---|---|---|
| Liquid crystal composition | Liquid crystal composition 16 | Liquid crystal composition 16 | Liquid crystal composition 16 | Liquid crystal composition 16 |
| Color filter | Color filter 1 | Color filter 2 | Color filter 3 | Color filter 4 |
| VHR | 99.5 | 99.4 | 99.2 | 99.1 |
| ID | 22 | 29 | 53 | 76 |
| Ghosting | AA | AA | AA | A |

TABLE 38

|  | Example 65 | Example 66 | Example 67 | Example 68 |
|---|---|---|---|---|
| Liquid crystal composition | Liquid crystal composition 17 | Liquid crystal composition 17 | Liquid crystal composition 17 | Liquid crystal composition 17 |
| Color filter | Color filter 1 | Color filter 2 | Color filter 3 | Color filter 4 |
| VHR | 99.4 | 99.3 | 99.0 | 98.9 |
| ID | 34 | 40 | 81 | 97 |
| Ghosting | AA | AA | A | A |

TABLE 39

|  | Example 69 | Example 70 | Example 71 | Example 72 |
|---|---|---|---|---|
| Liquid crystal composition | Liquid crystal composition 18 | Liquid crystal composition 18 | Liquid crystal composition 18 | Liquid crystal composition 18 |
| Color filter | Color filter 1 | Color filter 2 | Color filter 3 | Color filter 4 |
| VHR | 99.6 | 99.5 | 99.3 | 99.1 |
| ID | 17 | 27 | 44 | 82 |
| Ghosting | AA | AA | AA | A |

TABLE 40

|  | Example 73 | Example 74 | Example 75 | Example 76 |
|---|---|---|---|---|
| Liquid crystal composition | Liquid crystal composition 19 | Liquid crystal composition 19 | Liquid crystal composition 19 | Liquid crystal composition 19 |
| Color filter | Color filter 1 | Color filter 2 | Color filter 3 | Color filter 4 |
| VHR | 99.6 | 99.4 | 99.1 | 99.0 |
| ID | 18 | 35 | 85 | 99 |
| Ghosting | AA | AA | A | A |

The liquid crystal display devices of Examples 61 to 76 had high VHR and low ID. In the ghosting evaluation, either no afterimage was observed or afterimage was faint and at an acceptable level.

Examples 77 to 92

Liquid crystal display devices of Examples 77 to 92 were prepared as in Example 1 by using negative dielectric anisotropy liquid crystals indicated in Table 41 and the color filters 1 to 4 indicated in Table 8. The VHR and ID thereof were measured. Ghosting evaluation was also conducted on the liquid crystal display devices. The results are indicated in Tables 42 to 45.

TABLE 41

| | Liquid crystal composition 20 | Liquid crystal composition 21 | Liquid crystal composition 22 | Liquid crystal composition 23 |
|---|---|---|---|---|
| 2-Cy-2-Nd4—O2 | | 10 | | 10 |
| 3-Cy-1O—Ch3—O5 | 7 | | 10 | |
| 3-Cy-2-Nd4—O4 | | 10 | | 10 |
| 4-Cy-2-Nd4—O2 | | 10 | | 10 |
| 5-Cy-1O—Ch3—O5 | 7 | | 10 | |
| 5-Cy-2-Nd4—O2 | | 5 | | 5 |
| 0d1-Cy-Cy-3 | 30 | 40 | | |
| 0d1-Cy-Cy-5 | | | 15 | 20 |
| 3-Cy-Cy-4 | | | 15 | 14 |
| 3-Cy-Ph—O2 | | | | 10 |
| 5-Ph—Ph-1 | 10 | | 10 | |
| 2-Cy-Cy-2-Nd4—O2 | | 4 | | 4 |
| 3-Cy-Cy-1O—Ph5—O1 | 4 | | 3 | |
| 3-Cy-Cy-1O—Ph5—O2 | 9 | | 5 | |
| 3-Cy-Cy-2-Ph5—O2 | 10 | | 10 | |
| 3-Cy-Cy-Ph5—O2 | 10 | | 10 | |
| 4-Cy-Cy-1O—Ph5—O1 | 4 | | 3 | |
| 4-Cy-Cy-2-Nd4—O2 | | 4 | | 4 |
| 0d1-Cy-Cy-Ph-1 | 9 | 6 | 9 | 4 |
| 0d1-Cy-Ph—Ph-3 | | 5 | | 3 |
| 0d3-Cy-Cy-Ph-1 | | 6 | | 6 |
| Total (%) | 100 | 100 | 100 | 100 |
| Tni/° C. | 82.7 | 82.3 | 80.9 | 81.8 |
| Δn (20° C.) | 0.087 | 0.098 | 0.084 | 0.097 |
| η20/mPa·s | 19.4 | 18.1 | 26 | 22.7 |
| Δε (20° C.) | −3.1 | −3.1 | −3.1 | −3.2 |

TABLE 42

| | Example 77 | Example 78 | Example 79 | Example 80 |
|---|---|---|---|---|
| Liquid crystal composition | Liquid crystal composition 20 | Liquid crystal composition 20 | Liquid crystal composition 20 | Liquid crystal composition 20 |
| Color filter | Color filter 1 | Color filter 2 | Color filter 3 | Color filter 4 |
| VHR | 99.7 | 99.5 | 99.3 | 99.2 |
| ID | 15 | 22 | 64 | 76 |
| Ghosting | AA | AA | AA | AA |

TABLE 43

| | Example 81 | Example 82 | Example 83 | Example 84 |
|---|---|---|---|---|
| Liquid crystal composition | Liquid crystal composition 21 | Liquid crystal composition 21 | Liquid crystal composition 21 | Liquid crystal composition 21 |
| Color filter | Color filter 1 | Color filter 2 | Color filter 3 | Color filter 4 |
| VHR | 99.5 | 99.4 | 99.1 | 98.9 |
| ID | 31 | 39 | 89 | 98 |
| Ghosting | AA | AA | A | A |

TABLE 44

| | Example 85 | Example 86 | Example 87 | Example 88 |
|---|---|---|---|---|
| Liquid crystal composition | Liquid crystal composition 22 | Liquid crystal composition 22 | Liquid crystal composition 22 | Liquid crystal composition 22 |
| Color filter | Color filter 1 | Color filter 2 | Color filter 3 | Color filter 4 |
| VHR | 99.6 | 99.4 | 99.2 | 99.1 |
| ID | 24 | 36 | 84 | 90 |
| Ghosting | AA | AA | AA | A |

TABLE 45

| | Example 89 | Example 90 | Example 91 | Example 92 |
|---|---|---|---|---|
| Liquid crystal composition | Liquid crystal composition 23 | Liquid crystal composition 23 | Liquid crystal composition 23 | Liquid crystal composition 23 |
| Color filter | Color filter 1 | Color filter 2 | Color filter 3 | Color filter 4 |
| VHR | 99.5 | 99.4 | 99.1 | 99.0 |
| ID | 35 | 38 | 84 | 92 |
| Ghosting | AA | AA | A | A |

The liquid crystal display devices of Examples 77 to 92 had high VHR and low ID. In the ghosting evaluation, either no afterimage was observed or afterimage was faint and at an acceptable level.

Examples 93 to 100

Liquid crystal display devices of Examples 93 to 100 were prepared as in Example 1 by using negative dielectric anisotropy liquid crystals indicated in Table 46 and the color filters 1 to 4 indicated in Table 8. The VHR and ID thereof were measured. Ghosting evaluation was also conducted on the liquid crystal display devices. The results are indicated in Tables 47 and 48.

TABLE 46

| | Liquid crystal composition 24 | Liquid crystal composition 25 |
|---|---|---|
| 3-Cy-Ph5—O4 | 9 | 10 |
| 3O—Ph5—Ph5—O2 | 8 | |
| 5-Cy-Ph5—O4 | 9 | 10 |
| 0d1-Cy-Cy-5 | 5 | |
| 0d1-O-Cy-Cy-Ph5-1 | | 10 |
| 0d2-Cy-Cy-Ph5—O2 | 10 | |
| 0d2-O-Cy-Cy-Ph5-1 | | 10 |
| 1d2-O-Cy-Cy-Ph5-1 | | 8 |
| 2-Cy-Cy-Ph5-1 | 11 | 12 |

TABLE 46-continued

|  | Liquid crystal composition 24 | Liquid crystal composition 25 |
|---|---|---|
| 2-Cy-Cy-Ph5—O2 | 9 | 10 |
| 3-Cy-Cy-Ph5-1 | 10 | 11 |
| 3-Cy-Cy-Ph5—O2 | 10 | 10 |
| 3-O-Cy-Cy-Ph5—O2 | 10 |  |
| 5-Cy-Cy-Ph5—O2 | 9 | 9 |
| Total (%) | 100 | 100 |
| Tni/° C. | 101.2 | 103.9 |
| $\Delta n(20°$ C.) | 0.100 | 0.098 |
| ne(20° C.) | 1.581 | 1.579 |
| $\Delta\epsilon(20°$ C.) | −7.5 | −5.5 |
| $\epsilon\perp(20°$ C.) | 11.9 | 9.5 |
| K3/K1(20° C.) | 1.08 | 1.16 |
| K1/pN(20° C.) | 15.8 | 16.5 |

TABLE 47

|  | Example 93 | Example 94 | Example 95 | Example 96 |
|---|---|---|---|---|
| Liquid crystal composition | Liquid crystal composition 24 | Liquid crystal composition 24 | Liquid crystal composition 24 | Liquid crystal composition 24 |
| Color filter | Color filter 1 | Color filter 2 | Color filter 3 | Color filter 4 |
| VHR | 99.8 | 99.6 | 99.4 | 99.3 |
| ID | 12 | 18 | 44 | 71 |
| Ghosting | AA | AA | AA | AA |

TABLE 48

|  | Example 97 | Example 98 | Example 99 | Example 100 |
|---|---|---|---|---|
| Liquid crystal composition | Liquid crystal composition 25 | Liquid crystal composition 25 | Liquid crystal composition 25 | Liquid crystal composition 25 |
| Color filter | Color filter 1 | Color filter 2 | Color filter 3 | Color filter 4 |
| VHR | 99.6 | 99.5 | 99.3 | 99.2 |
| ID | 18 | 32 | 49 | 66 |
| Ghosting | AA | AA | AA | AA |

The liquid crystal display devices of Examples 93 to 100 had high VHR and low ID. In the ghosting evaluation, either no afterimage was observed or afterimage was faint and at an acceptable level.

Examples 101 to 112

Liquid crystal display devices of Examples 101 to 112 were prepared as in Example 1 by using negative dielectric anisotropy liquid crystals indicated in Table 49 and the color filters 1 to 4 indicated in Table 8. The VHR and ID thereof were measured. Ghosting evaluation was also conducted on the liquid crystal display devices. The results are indicated in Tables 50 to 52.

TABLE 49

|  | Liquid crystal composition 26 | Liquid crystal composition 27 | Liquid crystal composition 28 |
|---|---|---|---|
| 3-Cy-Ph5—O4 | 16 | 16 | 16 |
| 5-Cy-Ph5—O2 | 12 | 16 | 16 |
| 0d1-Cy-Cy-5 | 7 | 4 | 10 |
| 0d3-Ph—Ph-1 | 11 | 10 | 10 |
| 1d1-Cy-Cy-3 | 9 | 8 |  |
| 2-Cy-Ph—Ph5—O2 | 13 | 12 | 12 |
| 3-Cy-Cy-Ph5—O2 | 6 | 7 | 10 |

TABLE 49-continued

|  | Liquid crystal composition 26 | Liquid crystal composition 27 | Liquid crystal composition 28 |
|---|---|---|---|
| 3-Cy-Ph—Ph5—O2 | 12 | 12 | 12 |
| 0d1-Cy-Cy-Ph-1 | 4 | 4 | 4 |
| 3-Cy-Ph—Ph-2 | 10 | 11 | 10 |
| Total | 100 | 100 | 100 |
| Tni/° C. | 80.2 | 80.3 | 80.9 |
| $\Delta n(20°$ C.) | 0.128 | 0.129 | 0.126 |
| ne(20° C.) | 1.492 | 1.491 | 1.491 |
| $\Delta\epsilon(20°$ C.) | −3.3 | −3.5 | −3.7 |
| $\epsilon\perp(20°$ C.) | 6.8 | 7.1 | 7.4 |
| K3/K1(20° C.) | 0.99 | 1.01 | 1.04 |
| K1/pN(20° C.) | 16.7 | 15.2 | 16.4 |

TABLE 50

|  | Example 101 | Example 102 | Example 103 | Example 104 |
|---|---|---|---|---|
| Liquid crystal composition | Liquid crystal composition 26 | Liquid crystal composition 26 | Liquid crystal composition 26 | Liquid crystal composition 26 |
| Color filter | Color filter 1 | Color filter 2 | Color filter 3 | Color filter 4 |
| VHR | 99.6 | 99.5 | 99.3 | 99.2 |
| ID | 21 | 36 | 51 | 72 |
| Ghosting | AA | AA | AA | AA |

TABLE 51

|  | Example 105 | Example 106 | Example 107 | Example 108 |
|---|---|---|---|---|
| Liquid crystal composition | Liquid crystal composition 27 | Liquid crystal composition 27 | Liquid crystal composition 27 | Liquid crystal composition 27 |
| Color filter | Color filter 1 | Color filter 2 | Color filter 3 | Color filter 4 |
| VHR | 99.6 | 99.5 | 99.2 | 99.1 |
| ID | 19 | 30 | 80 | 92 |
| Ghosting | AA | AA | AA | A |

TABLE 52

|  | Example 109 | Example 110 | Example 111 | Example 112 |
|---|---|---|---|---|
| Liquid crystal composition | Liquid crystal composition 28 | Liquid crystal composition 28 | Liquid crystal composition 28 | Liquid crystal composition 28 |
| Color filter | Color filter 1 | Color filter 2 | Color filter 3 | Color filter 4 |
| VHR | 99.5 | 99.4 | 99.2 | 99.1 |
| ID | 28 | 40 | 78 | 89 |
| Ghosting | AA | AA | AA | A |

The liquid crystal display devices of Examples 101 to 112 had high VHR and low ID. In the ghosting evaluation, either no afterimage was observed or afterimage was faint and at an acceptable level.

Examples 113 to 124

Liquid crystal display devices of Examples 113 to 124 were prepared as in Example 1 by using negative dielectric anisotropy liquid crystals indicated in Table 53 and the color filters 1 to 4 indicated in Table 8. The VHR and ID thereof were measured. Ghosting evaluation was also conducted on the liquid crystal display devices. The results are indicated in Tables 54 to 56.

TABLE 53

|  | Liquid crystal composition 29 | Liquid crystal composition 30 | Liquid crystal composition 31 |
|---|---|---|---|
| 3-Cy-Ph5—O4 | 16 | 16 | 16 |
| 5-Cy-Ph5—O2 | 12 | 16 | 16 |
| 0d1-Cy-Cy-5 | 12 | 10 | 20 |
| 0d3-Ph—Ph-1 | 6 | 4 |  |
| 1d1-Cy-Cy-3 | 9 | 8 |  |
| 2-Ph—Ph5-Ph-2 | 13 | 12 | 12 |
| 3-Cy-Cy-Ph5—O2 | 6 | 7 | 10 |
| 3-Cy-Ph—Ph5—O2 | 12 | 12 | 12 |
| 0d1-Cy-Cy-Ph-1 | 4 | 4 | 4 |
| 3-Cy-Ph—Ph-2 | 10 | 11 | 10 |
| Total | 100 | 100 | 100 |
| Tni/° C. | 81.7 | 81.2 | 80.9 |
| $\Delta n(20° C.)$ | 0.127 | 0.130 | 0.131 |
| ne(20° C.) | 1.494 | 1.495 | 1.498 |
| $\Delta\epsilon(20° C.)$ | −3.0 | −3.3 | −3.6 |
| $\epsilon\perp(20° C.)$ | 6.9 | 7.2 | 7.5 |
| K3/K1(20° C.) | 1.02 | 1.03 | 1.06 |
| K1/pN(20° C.) | 15.8 | 15.6 | 16.2 |

TABLE 54

|  | Example 113 | Example 114 | Example 115 | Example 116 |
|---|---|---|---|---|
| Liquid crystal composition | Liquid crystal composition 29 | Liquid crystal composition 29 | Liquid crystal composition 29 | Liquid crystal composition 29 |
| Color filter | Color filter 1 | Color filter 2 | Color filter 3 | Color filter 4 |
| VHR | 99.7 | 99.5 | 99.3 | 99.2 |
| ID | 14 | 30 | 55 | 79 |
| Ghosting | AA | AA | AA | AA |

TABLE 55

|  | Example 117 | Example 118 | Example 119 | Example 120 |
|---|---|---|---|---|
| Liquid crystal composition | Liquid crystal composition 30 | Liquid crystal composition 30 | Liquid crystal composition 30 | Liquid crystal composition 30 |
| Color filter | Color filter 1 | Color filter 2 | Color filter 3 | Color filter 4 |
| VHR | 99.6 | 99.5 | 99.2 | 99.1 |
| ID | 17 | 33 | 64 | 82 |
| Ghosting | AA | AA | AA | A |

TABLE 56

|  | Example 121 | Example 122 | Example 123 | Example 124 |
|---|---|---|---|---|
| Liquid crystal composition | Liquid crystal composition 31 | Liquid crystal composition 31 | Liquid crystal composition 31 | Liquid crystal composition 31 |
| Color filter | Color filter 1 | Color filter 2 | Color filter 3 | Color filter 4 |
| VHR | 99.7 | 99.6 | 99.3 | 99.2 |
| ID | 20 | 27 | 59 | 74 |
| Ghosting | AA | AA | AA | AA |

The liquid crystal display devices of Examples 113 to 124 had high VHR and low ID. In the ghosting evaluation, either no afterimage was observed or afterimage was faint and at an acceptable level.

Examples 125 to 128

Liquid crystal display devices of Examples 125 to 128 were prepared as in Example 1 by using a negative dielectric anisotropy liquid crystal indicated in Table 57 and the color filters 1 to 4 indicated in Table 8. The VHR and ID thereof were measured. Ghosting evaluation was also conducted on the liquid crystal display devices. The results are indicated in Table 58.

TABLE 57

|  | Liquid crystal composition 32 |
|---|---|
| 0d1-Cy-Cy-5 | 20 |
| 3-Cy-2-Ph5—O2 | 20 |
| 0d1-Cy-Cy-Ph-1 | 5 |
| 5-Cy-2-Ph5—O2 | 20 |
| 3-Cy-Cy-2-Ph5—O2 | 3 |
| 5-Cy-Cy-Ph5—O2 | 3 |
| 3-Cy-Ph—Ph5—O2 | 5 |
| 3-Ph—Ph—Ph-2 | 7 |
| 4-Ph—Ph—Ph-2 | 7 |
| 3-Cy-Cy-VO—Ph-Cy-3 | 4 |
| 3-Cy-Cy-VO—Ph-Cy-4 | 3 |
| 3-Cy-Cy-VO—Ph-Cy-5 | 3 |
| Total | 100 |
| Tni/° C. | 81.6 |
| $\Delta n$ (20° C.) | 0.127 |
| ne (20° C.) | 1.495 |
| $\Delta\epsilon$ (20° C.) | −3.0 |

TABLE 58

|  | Example 125 | Example 126 | Example 127 | Example 128 |
|---|---|---|---|---|
| Liquid crystal composition | Liquid crystal composition 32 | Liquid crystal composition 32 | Liquid crystal composition 32 | Liquid crystal composition 32 |
| Color filter | Color filter 1 | Color filter 2 | Color filter 3 | Color filter 4 |
| VHR | 99.5 | 99.4 | 99.2 | 99.1 |
| ID | 24 | 39 | 64 | 88 |
| Ghosting | AA | AA | AA | A |

The liquid crystal display devices of Examples 125 to 128 had high VHR and low ID. In the ghosting evaluation, either no afterimage was observed or afterimage was faint and at an acceptable level.

Examples 129 to 132

A liquid crystal composition 33 was prepared by mixing the liquid crystal composition 1 having negative dielectric anisotropy used in Example 1 and 0.3% by mass of 2-methyl-acrylic acid 4'-{2-[4-(2-acryloyloxy-ethyl)-phenoxycarbonyl]-ethyl}-biphenyl-4-yl ester. The liquid crystal composition 33 was placed in the VA cell used in Example 1 and irradiated with UV light (3.0 J/cm$^2$) for 600 seconds while applying drive voltage between the electrodes so as to conduct polymerization treatment. Then liquid crystal display devices of Examples 129 to 132 were prepared by using the color filters 1 to 4 indicated in Table 8, and the VHR and ID thereof were measured. Ghosting evaluation was also conducted on the liquid crystal display devices. The results are indicated in Table 59.

TABLE 59

|  | Example 129 | Example 130 | Example 131 | Example 132 |
|---|---|---|---|---|
| Liquid crystal composition | Liquid crystal composition 33 | Liquid crystal composition 33 | Liquid crystal composition 33 | Liquid crystal composition 33 |
| Color filter | Color filter 1 | Color filter 2 | Color filter 3 | Color filter 4 |
| VHR | 99.5 | 99.4 | 99.0 | 98.8 |
| ID | 23 | 43 | 78 | 97 |
| Ghosting | AA | AA | A | A |

The liquid crystal display devices of Examples 129 to 132 had high VHR and low ID. In the ghosting evaluation, either no afterimage was observed or afterimage was faint and at an acceptable level.

Examples 133 to 136

A liquid crystal composition 34 was prepared by mixing the liquid crystal composition 29 having negative dielectric anisotropy and 0.3% by mass of bismethacrylic acid biphenyl -4,4'-diyl. The liquid crystal composition 34 was placed in the VA cell used in Example 1 and irradiated with UV light (3.0 J/cm$^2$) for 600 seconds while applying drive voltage between the electrodes so as to conduct polymerization treatment. Then liquid crystal display devices of Examples 133 to 136 were prepared by using the color filters 1 to 4 indicated in Table 8, and the VHR and ID thereof were measured. Ghosting evaluation was also conducted on the liquid crystal display devices. The results are indicated in Table 60.

TABLE 60

| | Example 133 | Example 134 | Example 135 | Example 136 |
|---|---|---|---|---|
| Liquid crystal composition | Liquid crystal composition 34 | Liquid crystal composition 34 | Liquid crystal composition 34 | Liquid crystal composition 34 |
| Color filter | Color filter 1 | Color filter 2 | Color filter 3 | Color filter 4 |
| VHR | 99.5 | 99.4 | 99.2 | 99.1 |
| ID | 25 | 40 | 76 | 92 |
| Ghosting | AA | AA | A | A |

The liquid crystal display devices of Examples 133 to 136 had high VHR and low ID. In the ghosting evaluation, either no afterimage was observed or afterimage was faint and at an acceptable level.

Examples 137 to 140

A liquid crystal composition 35 was prepared by mixing the liquid crystal composition 32 having negative dielectric anisotropy and 0.3% by mass of bismethacrylic acid 3-fluorobiphenyl-4,4'-diyl. The liquid crystal composition 35 was placed in the VA cell used in Example 1 and irradiated with UV light (3.0 J/cm$^2$) for 600 seconds while applying drive voltage between the electrodes so as to conduct polymerization treatment. Then liquid crystal display devices of Examples 137 to 140 were prepared by using the color filters 1 to 4 indicated in Table 8, and the VHR and ID thereof were measured. Ghosting evaluation was also conducted on the liquid crystal display devices. The results are indicated in Table 61.

TABLE 61

| | Example 137 | Example 138 | Example 139 | Example 140 |
|---|---|---|---|---|
| Liquid crystal composition | Liquid crystal composition 35 | Liquid crystal composition 35 | Liquid crystal composition 35 | Liquid crystal composition 35 |
| Color filter | Color filter 1 | Color filter 2 | Color filter 3 | Color filter 4 |
| VHR | 99.6 | 99.5 | 99.2 | 99.0 |
| ID | 23 | 33 | 74 | 95 |
| Ghosting | AA | AA | AA | A |

The liquid crystal display devices of Examples 137 to 140 had high VHR and low ID. In the ghosting evaluation, either no afterimage was observed or afterimage was faint and at an acceptable level.

The invention claimed is:

1. A liquid crystal display device comprising a first substrate, a second substrate, a liquid crystal composition layer disposed between the first substrate and the second substrate, a color filter that includes a black matrix and at least RGB three-color pixel units, a pixel electrode, and a common electrode,
wherein the liquid crystal composition layer is composed of a liquid crystal composition that contains one or more compounds selected from the group consisting of compounds represented by general formula (LC1) and general formula (LC2):

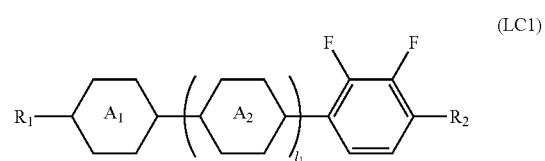

(LC1)

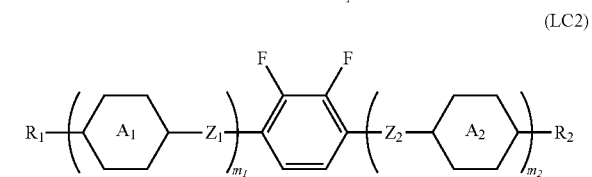

(LC2)

(In the formulae, R$_1$ and R$_2$ each independently represent an alkyl group having 1 to 15 carbon atoms where one or more CH$_2$ groups in the alkyl group may each be substituted with —O—, —CH═CH—, —CO—, —OCO—, —COO—, —C≡C—, —CF$_2$O—, or —OCF$_2$— so long as oxygen atoms are not directly adjacent to each other and one or more hydrogen atoms in the alkyl group may each be substituted with a halogen, A$_1$ and A$_2$ each independently represent one of the following structures:

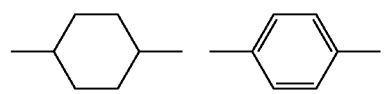

Z$_1$ and Z$_2$ each independently represent a single bond, —CH═CH—, —C≡C—, —CH$_2$CH$_2$—, —(CH$_2$)$_4$—, —COO—, —OCH$_2$—, —CH$_2$O—, —OCF$_2$—, or —CF$_2$O—, at least one of Z$_1$ and Z$_2$ that are present represents a group other than a single bond, l$_1$ represents 0 or 1, m$_1$ and m$_2$ each independently represent 0 to 3, and m$_1$+m$_2$ is 1, 2, or 3.), and
the RGB three-color pixel units contain, as a coloring material, a pigment that has a water-soluble content of 0% by mass or more and 1.5% by mass or less and/or an electrical conductivity of 10 μS/cm or more and 150 μS/cm or less.

2. The liquid crystal display device according to claim 1, wherein the RGB three-color pixel units contain, as a coloring material, a pigment that has a water-soluble content of 0% by mass or more and 1.0% by mass or less and an electrical conductivity of 10 μS/cm or more and 100 μS/cm or less.

3. The liquid crystal display device according to claim 1, wherein the RGB three-color pixel units contain, as a coloring material, a diketopyrrolopyrrole red pigment in an R pixel unit, a halogenated metal phthalocyanine pigment in a G pixel unit, and a ε-phthalocyanine pigment and/or a triarylmethane pigment in a B pixel unit.

4. The liquid crystal display device according to claim 3, wherein the halogenated metal phthalocyanine pigment contained in the G pixel unit is a halogenated metal phthalocyanine pigment that has, as a center metal, a metal selected from the group consisting of Al, Si, Sc, Ti, V, Mg, Fe, Co, Ni, Zn, Cu, Ga, Ge, Y, Zr, Nb, In, Sn, and Pb, in which when the center metal is trivalent, one halogen atom, hydroxyl group, or sulfonic acid group is bonded or oxo- or thio-bridged to the center metal, and when the center metal is a tetravalent metal, one oxygen atom or two of the same kind or different kinds selected from a halogen atom, a hydroxyl group, and a sulfonic acid group are bonded to the center metal.

5. The liquid crystal display device according to claim 3, wherein the halogenated metal phthalocyanine pigment contained in the G pixel unit is C.I. Pigment Green 58.

6. The liquid crystal display device according to claim 3, wherein the ε-phthalocyanine pigment contained in the B pixel unit is C.I. Pigment Blue 15:6.

7. The liquid crystal display device according to claim 3, wherein the diketopyrrolopyrrole red pigment contained in the R pixel unit is one or more selected from C.I. Pigments Red 254, 255, 264, and 272, and Orange 71 and 73.

8. The liquid crystal display device according to claim 1, wherein the color filter includes a black matrix, RGB three-color pixel units, and a Y pixel unit, and the Y pixel unit further contains, as a coloring material, a pigment having a water-soluble content of 1.5% or less and/or an electrical conductivity of 150 μS/cm or less.

9. The liquid crystal display device according to claim 1, wherein a liquid crystal composition further containing one or more compounds represented by general formula (LC5) is used for the liquid crystal composition layer:

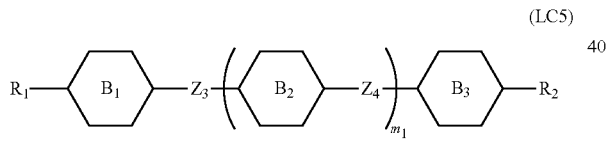

(LC5)

(In the formula, $R_1$ and $R_2$ each independently represent an alkyl group having 1 to 15 carbon atoms where one or more $CH_2$ groups in the alkyl group may each be substituted with —O—, —CH=CH—, —CO—, —OCO—, —COO—, —C≡C—, —CF$_2$O—, or —OCF$_2$— so long as oxygen atoms are not directly adjacent to each other and one or more hydrogen atoms in the alkyl group may each be substituted with a halogen, $B_1$ to $B_3$ each independently represent any one of the following:

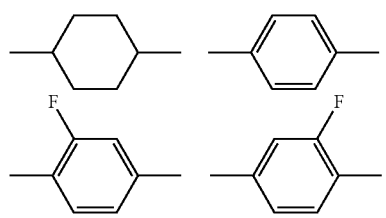

(In the formulae, one or more $CH_2CH_2$ groups in a cyclohexane ring may each be substituted with —CH=CH—, —CF$_2$O—, or —OCF$_2$— and one or more CH groups in a benzene ring may each be substituted with a nitrogen atom), $Z_3$ and $Z_4$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—, at least one of $Z_3$ and $Z_4$ represents a group other than a single bond, and $m_1$ represents 0 to 3.).

10. The liquid crystal display device according to claim 1, wherein the compound represented by general formula (LC1) is one or more compounds selected from the group consisting of compounds represented by general formula (LC1)-1 to general formula (LC1)-5 below:

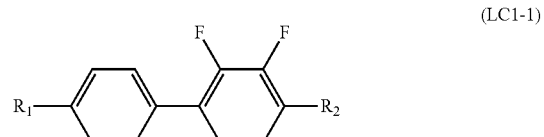

(LC1-1)

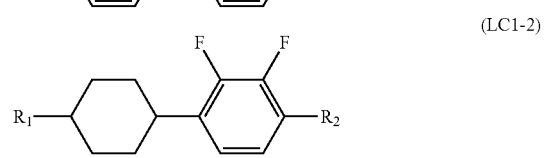

(LC1-2)

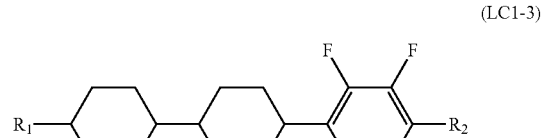

(LC1-3)

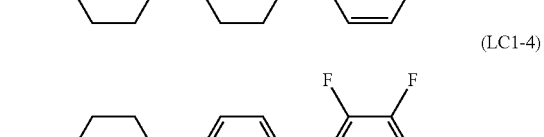

(LC1-4)

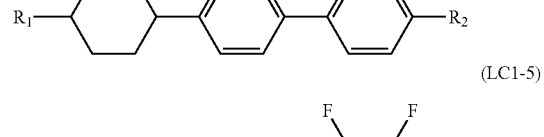

(LC1-5)

(In the formulae, $R_1$ and $R_2$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms).

11. The liquid crystal display device according to claim 9, wherein the compound represented by general formula (LC5) is one or more compounds selected from the group consisting of compounds represented by general formula (LC5)-1 to general formula (LC5)-13:

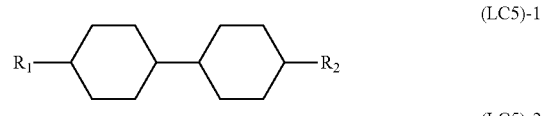

(LC5)-1

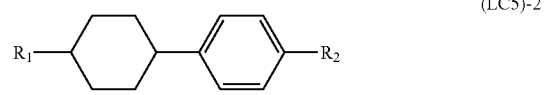

(LC5)-2

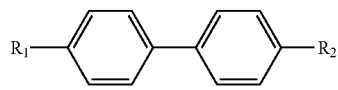 (LC5)-3

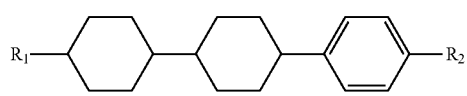 (LC5)-4

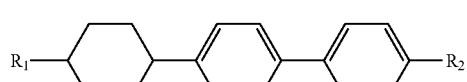 (LC5)-5

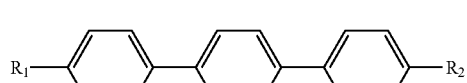 (LC5)-6

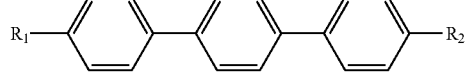 (LC5)-7

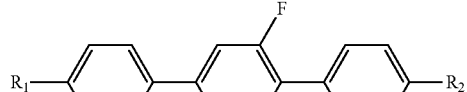 (LC5)-8

 (LC5)-9

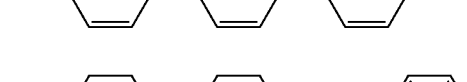 (LC5)-10

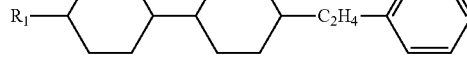 (LC5)-11

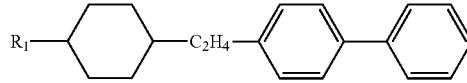 (LC5)-12

 (LC5)-13

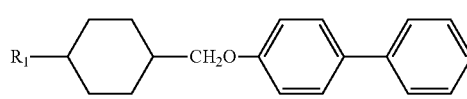

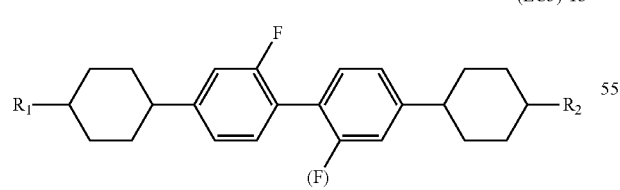

(In the formulae, $R_1$ and $R_2$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms).

12. The liquid crystal display device according to claim 1, wherein the liquid crystal composition further contains one or more polymerizable compounds, wherein the liquid crystal composition layer is composed of a polymer prepared by polymerizing the liquid crystal composition.

13. The liquid crystal display device according to claim 12, wherein the polymerizable compounds are represented by general formula (PC1):

 (PC1)

(In the formula, $P_1$ represents a polymerizable functional group, $Sp_1$ represents a spacer group having 0 to 20 carbon atoms, $Q_1$ represents a single bond, —O—, —NH—, —NHCOO—, —OCONH—, —CH=CH—, —CO—, —COO—, —OCO—, —OCOO—, —OOCO—, —CH=CH—, —CH=CH—COO—, —OCO—CH=CH—, or —C≡C—, $n_1$ and $n_2$ each represent 1, 2, or 3, MG represents a mesogenic group or a mesogenic supporting group, and $R_3$ represents a halogen atom, a cyano group, or an alkyl group having 1 to 25 carbon atoms where one or more $CH_2$ groups in the alkyl group may each be substituted with —O—, —S—, —NH—, —N(CH$_3$)—, —CO—, —COO—, —OCO—, —OCOO—, —SCO—, —COS—, or —C≡C— so long as oxygen atoms are not directly adjacent to each other or $R_3$ represents $P_2$-$Sp_2$-$Q_2$- (in the formula, $P_2$, $Sp_2$, and $Q_2$ are each independently the same as $P_1$, $Sp_1$, and $Q_1$.)).

14. The liquid crystal display device according to claim 1, wherein the compound represented by general formula (LC2) is one or more compounds selected from the group consisting of compounds represented by general formula (LC2)-1 to general formula (LC2)-13 below:

 (LC2)-1

 (LC2)-2

 (LC2)-3

 (LC2)-4

 (LC2)-5

(LC2)-6
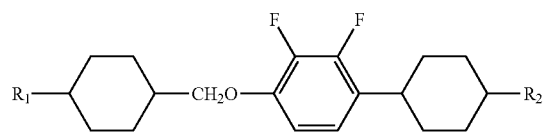
(LC2)-7
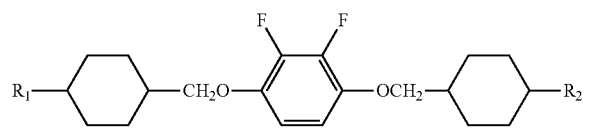
(LC2)-8
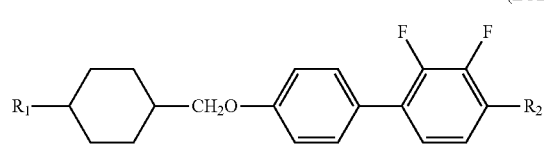
(LC2)-9
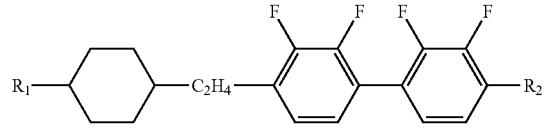
(LC2)-10
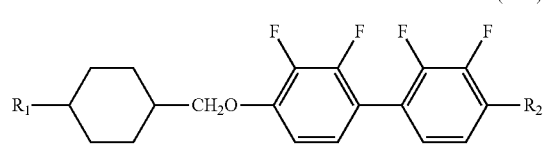
(LC2)-11
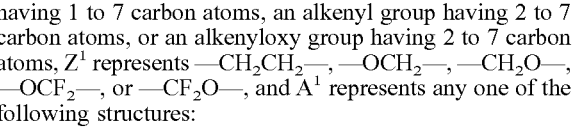
(LC2)-12
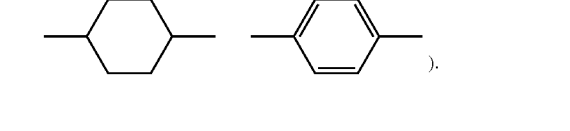
(LC2)-13
(In the formulae, $R_1$ and $R_2$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms, $Z^1$ represents —CH$_2$CH$_2$—, —OCH$_2$—, —CH$_2$O—, —OCF$_2$—, or —CF$_2$O—, and $A^1$ represents any one of the following structures:
 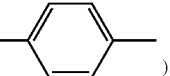).
* * * * *